(12) United States Patent
Maeda

(10) Patent No.: US 9,489,984 B2
(45) Date of Patent: Nov. 8, 2016

(54) DISPLAY APPARATUS, INFORMATION TERMINAL, DISPLAY SYSTEM, AND PROGRAM

(71) Applicant: Hiroshi Maeda, Kanagawa (JP)

(72) Inventor: Hiroshi Maeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/503,710

(22) Filed: Oct. 1, 2014

(65) Prior Publication Data

US 2015/0097758 A1    Apr. 9, 2015

(30) Foreign Application Priority Data

Oct. 8, 2013 (JP) ................. 2013-210909

(51) Int. Cl.
| | |
|---|---|
| G09G 5/00 | (2006.01) |
| G11B 27/10 | (2006.01) |
| G11B 27/11 | (2006.01) |
| H04N 21/414 | (2011.01) |
| H04N 21/431 | (2011.01) |
| G06F 3/14 | (2006.01) |

(52) U.S. Cl.
CPC ............ *G11B 27/105* (2013.01); *G11B 27/11* (2013.01); *H04N 21/41415* (2013.01); *H04N 21/4312* (2013.01); *G06F 3/1454* (2013.01)

(58) Field of Classification Search
CPC .............. A63F 2300/407; H04N 21/4325; H04N 7/147; H04N 1/00352; H04N 1/00408; H04N 1/00411; H04N 1/00413; H04N 1/00474; H04N 1/00477; H04N 21/4622; H04N 5/85; H04N 21/42646; H04N 21/84; H04N 1/00204; H04N 21/42215; H04N 21/4307; H04N 2201/0039; H04N 5/765; H04N 21/4334; G02B 2027/014; G02B 2027/0138; G11B 27/34; G11B 27/36; G11B 20/10; G11B 27/28; G06F 3/147; H04M 1/72569; H04M 2250/52
See application file for complete search history.

(56) References Cited

U.S. PATENT DOCUMENTS

| | | | | | |
|---|---|---|---|---|---|
| 6,118,445 | A | * | 9/2000 | Nonomura ............ | G06F 9/4443 715/723 |
| 6,473,096 | B1 | * | 10/2002 | Kobayashi ........ | G06F 17/30017 707/E17.009 |
| 8,316,055 | B2 | * | 11/2012 | Warner ................. | G06F 3/0605 707/790 |
| 2003/0108333 | A1 | * | 6/2003 | Kanegae .......... | G11B 20/00086 386/241 |

(Continued)

FOREIGN PATENT DOCUMENTS

| | | |
|---|---|---|
| JP | 2011-059675 | 3/2011 |
| JP | 2013-003327 | 1/2013 |

*Primary Examiner* — Andrew Sasinowski
*Assistant Examiner* — Gerald Oliver
(74) *Attorney, Agent, or Firm* — Oblon, McClelland, Maier & Neustadt, L.L.P.

(57) ABSTRACT

A display apparatus which can communicate with an information terminal via a network is disclosed. The display apparatus includes a receiving unit which receives content data which are caused to be displayed on the display apparatus and reproduction control information on reproduction of the content data from the information terminal, an execution information generation unit which causes the reproduction control information to be execution information corresponding to the display apparatus, and a display unit which causes the content data to be displayed on the display apparatus based on the execution information.

12 Claims, 16 Drawing Sheets

(56) References Cited

U.S. PATENT DOCUMENTS

| | | | |
|---|---|---|---|
| 2008/0063200 A1* | 3/2008 | Takashima | G11B 20/00086 380/201 |
| 2008/0088741 A1* | 4/2008 | Kitajima | G11B 27/034 348/565 |
| 2011/0072083 A1* | 3/2011 | Suetsugu | G06F 13/385 709/203 |
| 2013/0060366 A1* | 3/2013 | Nagano | H04N 21/26258 700/94 |
| 2013/0120613 A1* | 5/2013 | Nitta | H04N 5/23216 348/231.99 |

* cited by examiner

FIG.6A

| REQUEST TYPE | HTTP METHOD | URI |
|---|---|---|
| REQUEST FOR PROJECTION EXECUTION | PUT | /service/projection |
| REQUEST FOR SAVING FILE TO RECORDING MEDIUM | POST | /service/storage |
| ... | ... | ... |

FIG.6B

HTTP REQUEST
(REQUEST FOR PROJECTION EXECUTION FROM INFORMATION TERMINAL TO DISPLAY APPARATUS)

PUT /service/projection/1 HTTP/1.1  } REQUEST LINE ~411
Host: projector.example.jp          } HEADER ~412
Content-Type: application/json

[ "path":"/QS/Playlist_1/playlist.json", "type":"playlist" }  } BODY ~413

HTTP RESPONSE (RESPONSE FROM DISPLAY APPARATUS TO INFORMATION TERMINAL)

HTTP/1.1 200 OK  } STATUS LINE ~414

FIG.6C

HTTP REQUEST
(REQUEST FOR FILE SAVING FROM INFORMATION TERMINAL TO DISPLAY APPARATUS)

POST /service/storage/files/usb1/QS/Playlist_1/file_1.jpeg HTTP/1.1 } REQUEST LINE ~421
Host: projector.example.jp                                          } HEADER ~422
Content-type: application/octet-stream <binary data>  } BODY ~423

HTTP RESPONSE (RESPONSE FROM DISPLAY APPARATUS TO INFORMATION TERMINAL)

HTTP/1.1 201 Created                                                            } STATUS LINE ~424
Content-Length: 0                                                               } ~425
Location: http://projector.example.jp/service/storage/files/usb1/QS/Playlist_1/file_1.jpeg } HEADER

FIG.7

```
|- QS
    |- Playlist_1
    |    |- file_1.jpeg
    |    |- file_2.jpeg
    |    |- file_3.jpeg
    |    |- file_4.jpeg
    |    |- file_5.jpeg
    |    |- file_11.jpeg
    |    |- file_113.jpeg
    |    |- playlist.json
    |
    |- Playlist_2
         |- file_1.jpeg
         |- file_2.jpeg
         |- file_10.jpeg
```

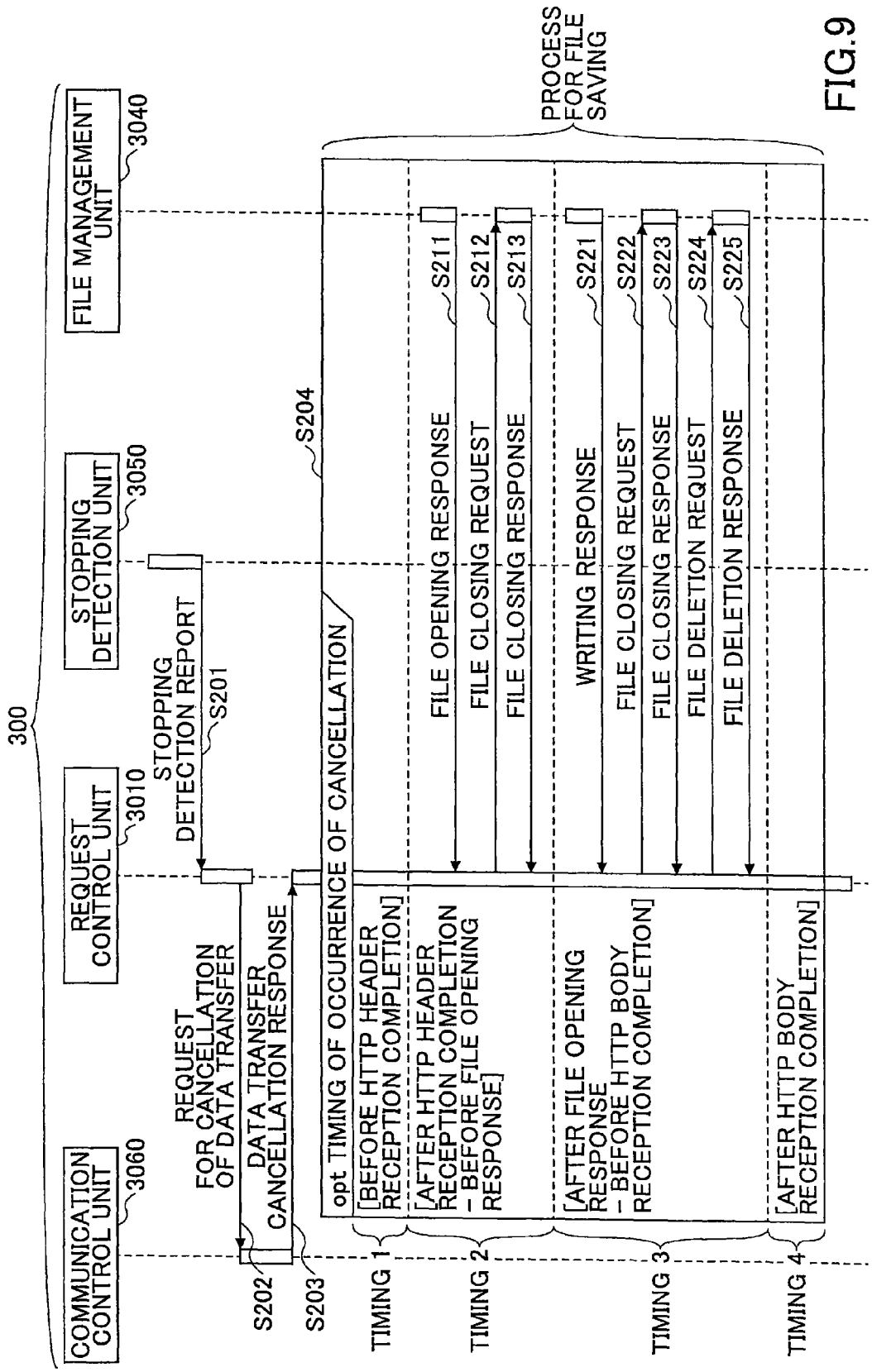

FIG.10A

STOPPING CAUSE CODE TABLE

| STOPPING CAUSE TYPE CODE | STOPPING CAUSE TYPE |
|---|---|
| 0001 | STANDBY TRANSFER |
| 0002 | INPUT SWITCHING |
| 0003 | SHORTAGE OF AVAILABLE VOLUME IN USB MEMORY |
| 0004 | INACCESSIBILITY TO USB MEMORY |
| ... | ... |

FIG.10B

STOPPING CAUSE TYPE TABLE

| STOPPING CAUSE TYPE CODE | BEFORE HTTP HEADER RECEPTION COMPLETION (TIMING 1) | AFTER HTTP HEADER RECEPTION COMPLETION – BEFORE FILE OPENING RESPONSE (TIMING 2) | AFTER FILE OPENING RESPONSE – BEFORE HTTP BODY RECEPTION COMPLETION (TIMING 3) | AFTER HTTP BODY RECEPTION COMPLETION (TIMING 4) |
|---|---|---|---|---|
| 0001 | DO NOTHING | FILE CLOSING | CLOSE FILE AND DELETE WRITTEN FILE | DO NOTHING |
| 0002 | CONTINUE FILE SAVING PROCESS | CONTINUE FILE SAVING PROCESS | CONTINUE FILE SAVING PROCESS | CONTINUE FILE SAVING PROCESS |
| 0003 | DO NOTHING | FILE CLOSING | CLOSE FILE AND DELETE WRITTEN FILE | CLOSE FILE AND DELETE WRITTEN FILE |
| 0004 | DO NOTHING | – | – | – |
| ... | ... | ... | ... | ... |

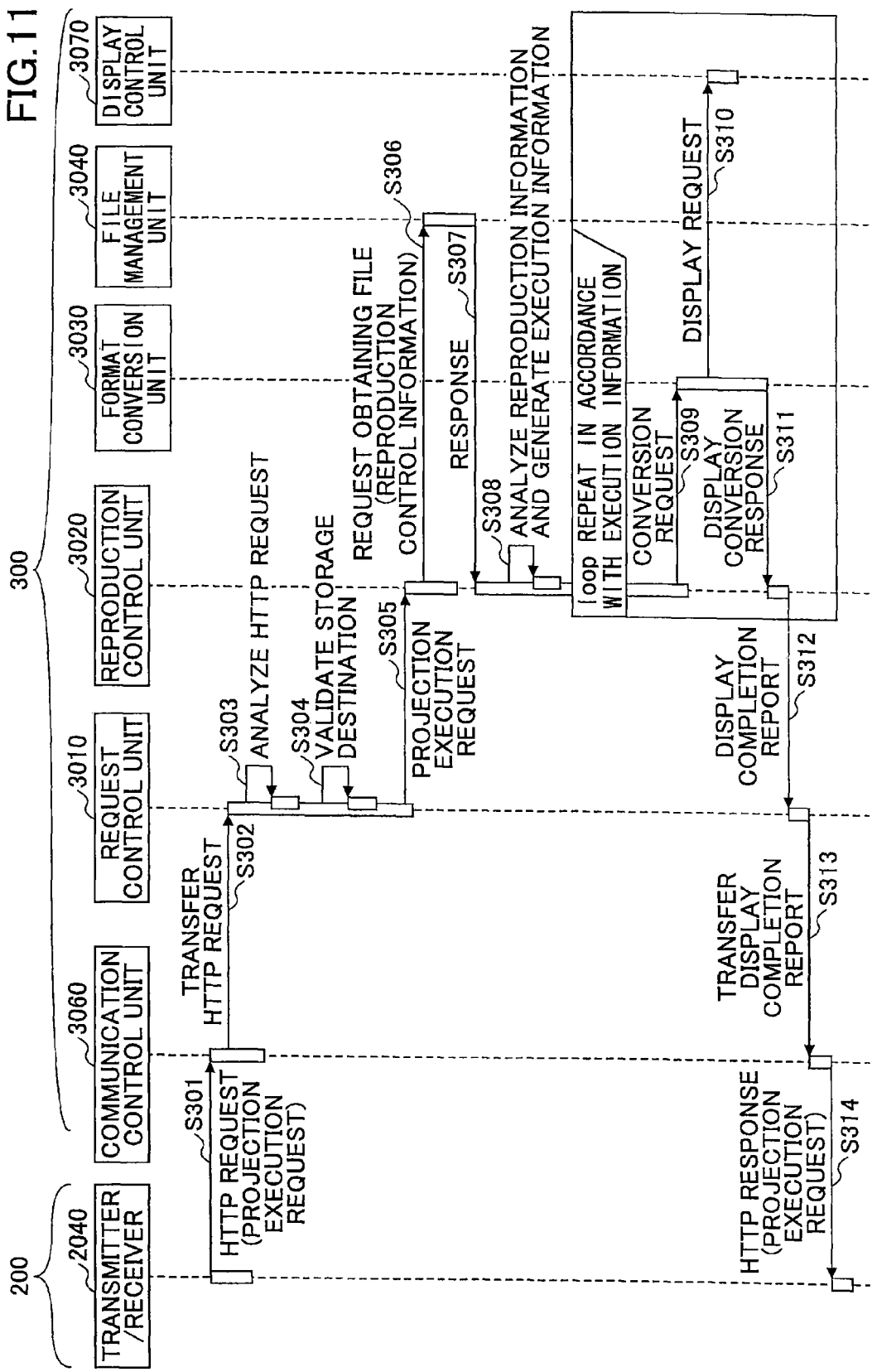

FIG.12

```
{
  "version":"1.0.0","order":0,
  "contents_list":[
    {"path":"/QS/Playlist_1/file_1.jpeg"},
    {"path":"/QS/Playlist_1/file_4.jpeg","time":15,"effect":2},
    {"path":"/QS/Playlist_1/file_2.jpeg","time":15,"effect":2},
    {"path":"/QS/Playlist_1/file_11.jpeg","time":5,"effect":2},
    {"path":"/QS/Playlist_1/file_113.jpeg","time":20,"effect":3}]
}
```

FIG.14

| SETTING ITEM | SETTING RANGE | INITIAL VALUE |
|---|---|---|
| Order | 0: DESIGNATED ORDER<br>1: REVERSE ORDER<br>2: RANDOM | 0: DESIGNATED ORDER |
| Time | 1-30 SECONDS<br>CAN BE SET IN UNITS<br>OF SECOND | 5 SECONDS |
| Effect | 0: FADE IN<br>1: PUSH TO LEFT<br>2: PUSH TO RIGHT<br>3: WIPE TO LEFT<br>4: WIPE TO RIGHT<br>5: NONE | 0: FADE IN |

FIG.15

```
{
  "version":"1.0.0","order":0,
  "contents_list":[
    {"path":"/QS/Playlist_1/file_1.jpeg","time":5,"effect":0},
    {"path":"/QS/Playlist_1/file_4.jpeg","time":15,"effect":2},
    {"path":"/QS/Playlist_1/file_2.jpeg","time":15,"effect":2},
    {"path":"/QS/Playlist_1/file_11.jpeg","time":5,"effect":2},
    {"path":"/QS/Playlist_1/file_113.jpeg","time":20,"effect":3}]
]
```

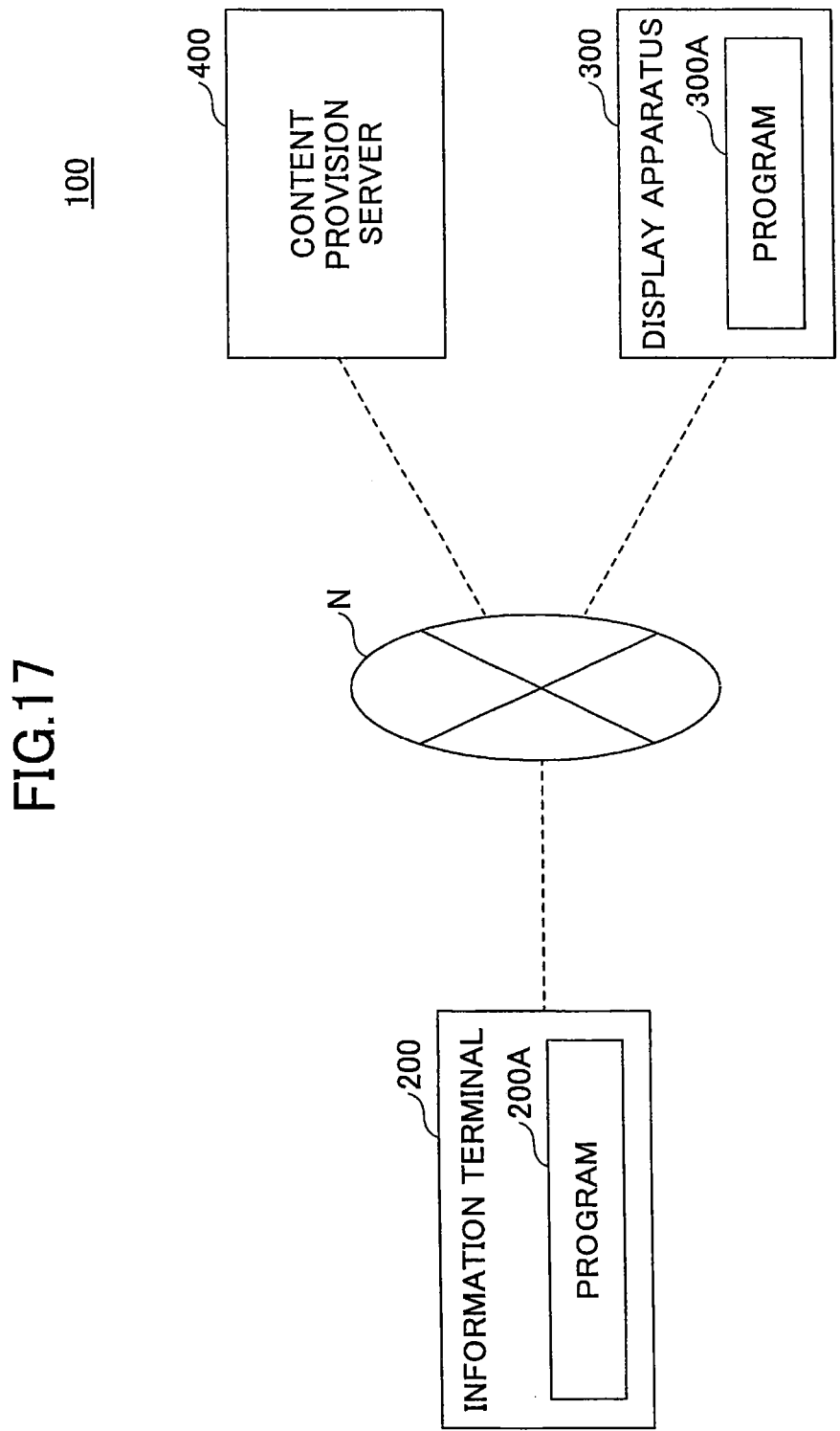

DISPLAY APPARATUS, INFORMATION TERMINAL, DISPLAY SYSTEM, AND PROGRAM

TECHNICAL FIELD

The present invention relates to display apparatuses, information terminals, display systems, and programs.

BACKGROUND ART

In the related art is known, for example, a technique of providing image data from an information terminal to a display apparatus and causing the display apparatus to display an image. In the related art, values which are adjusted to various setting values of the display apparatus are set. In recent years, measures have been made to reduce efforts for adjusting the setting values of the display apparatus.

As one of the measures is known a method of transmitting display setting information for designating setting states related to image displaying from an information terminal on the side of providing image data to a display apparatus and causing the display apparatus to perform setting in accordance with the display setting information (Patent Document 1).

However, in the above-described method, the display apparatus merely sets values related to displaying, such as display brightness, color mode, etc. Therefore, when causing the display apparatus to display content data which include multiple image data sets, etc., for example, it is difficult to cause the display apparatus to set information on reproduction of the content data, such as an order of image displaying, display time, etc.

PATENT DOCUMENT

Patent Document 1: JP2013-003327A

DISCLOSURE OF THE INVENTION

In light of the problems as described above, an object of one embodiment of the present invention is to provide display apparatuses, information terminals, display systems, and programs which make it possible to set information on reproduction of content data.

According to an embodiment of the present invention is provided a display apparatus which can communicate with an information terminal via a network, including a receiving unit which receives content data which are caused to be displayed on the display apparatus and reproduction control information on reproduction of the content data from the information terminal, an execution information generation unit which causes the reproduction control information to be execution information corresponding to the display apparatus, and a display unit which causes the content data to be displayed on the display apparatus based on the execution information.

Embodiments of the present invention make it possible to cause a display apparatus to set information on reproduction of content data.

Other objects, features, and advantages of the present invention will become more apparent from the following detailed descriptions when read in conjunction with the accompanying drawings, in which:

FIGS. 6A to 6C are diagrams for explaining one example of a process request from the information terminal to the display apparatus according to the present embodiment;

FIG. 7 is a diagram for explaining one example of a directory configuration of a recording medium of the display apparatus according to the present embodiment;

FIG. 9 is an exemplary sequence diagram of a process when the process of file saving is stopped in the display apparatus according to the present embodiment;

FIGS. 10A and 10B are diagrams explaining exemplary stopping cause code table and stopping cause type table that are included by the display apparatus according to the present embodiment;

FIG. 11 is an exemplary sequence diagram of a projection execution process in the display apparatus according to the present embodiment;

FIG. 12 is a diagram explaining exemplary reproduction control information according to the present embodiment;

FIG. 14 is a diagram explaining an exemplary setting item value table according to the present embodiment;

FIG. 15 is a diagram explaining exemplary execution information according to the present embodiment;

FIG. 17 is a diagram illustrating an exemplary system configuration of the display system according to a variation of the present embodiment.

BEST MODE FOR CARRYING OUT THE INVENTION

According to one embodiment of the present invention, reproduction control information in which are set content data such as image data, etc., and how to reproduce the content data is transmitted to a display apparatus. Then, the display apparatus saves the content data and the reproduction control information in a recording medium. Moreover, the display apparatus generates execution information from reproduction control information. The execution information is the reproduction control information, which is provided in a format executable by the display apparatus. The display apparatus reproduces content data based on the execution information.

Moreover, if a cause of stopping a process occurs while conducting the process of saving, into the recording medium, a file including the content data, the reproduction control information, etc., the process is conducted in accordance with the type of the cause of the stoppage. In the explanation of the embodiments below, a process of saving a file including the content data, the preproduction control information, etc., into the recording medium will be referred to as the process of file saving. The process of file saving according to the present embodiment is to be used interchangeably with that of writing data into the recording medium.

Figure 1:
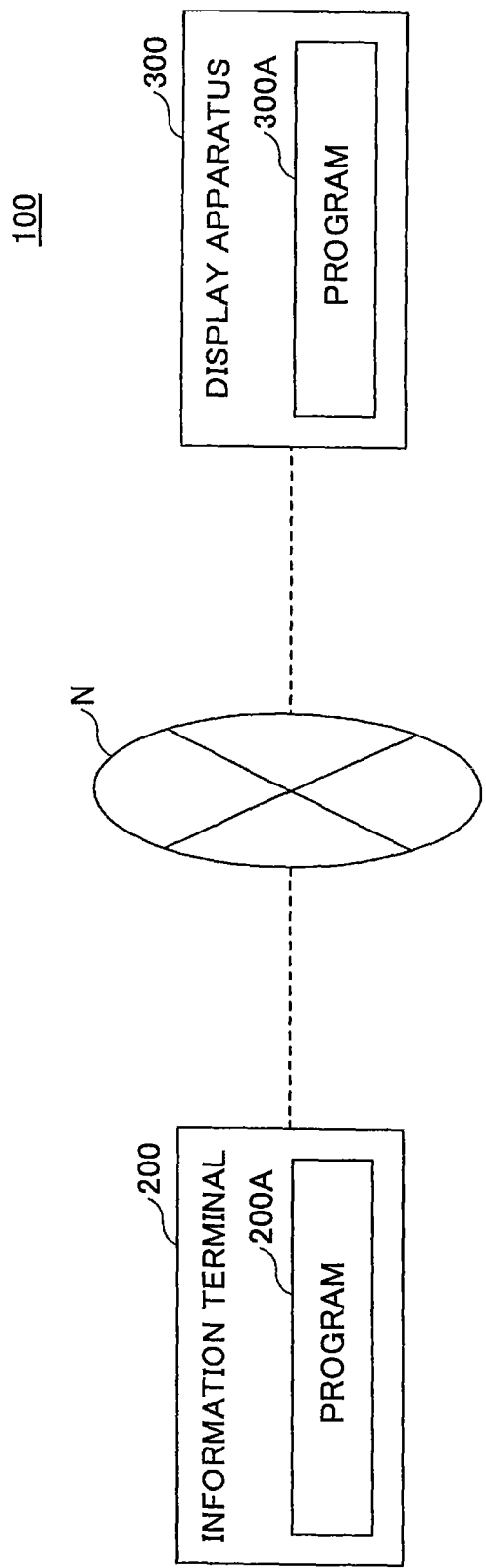
FIG. 1 is a diagram illustrating an exemplary system configuration of a display system according to the present embodiment.

Below, embodiments of the present invention are described with reference to the drawings. FIG. 1 is a diagram illustrating an exemplary system configuration of a display system according to the present embodiment.

A display system 100 according to the present embodiment includes an information terminal 200 and a display apparatus 300, which are connected via a data transmission path N such as a network.

The information terminal 200 according to the present embodiment may conduct communication by a communication scheme which is compliant with standards such as 3G ($3^{rd}$ generation), LTE (Long Term Evolution), 4G ($4^{th}$ generation), etc., for example. Moreover, the information terminal 200 according to the present embodiment may conduct communication by a communication scheme which is compliant with ZigBee, Bluetooth (registered trademark), etc., for example.

The information terminal 200 according to the present embodiment may be a wireless communication terminal such as a smartphone, a mobile telephone, etc., for example. Moreover, the information terminal 200 according to the present embodiment may be a tablet PC (personal computer) or a notebook PC, for example. The information terminal 200 according to the present embodiment may be anything as long as it can communicate with the display apparatus 300.

The information terminal 200 according to the present embodiment has a program 200A installed therein. The information terminal 200 according to the present embodiment executes the program 200A to generate reproduction control information for content data to be displayed in the display apparatus 300.

The information terminal 300 according to the present embodiment has a program 300A installed therein. The display apparatus 300 according to the present embodiment executes the program 300A to cause the content data transmitted from the information terminal 200 to be displayed based on the execution information.

The display apparatus 300 according to the present embodiment generates execution information based on the reproduction control information transmitted from the information terminal 200. Moreover, when stopping of a process occurs when conducting the process of saving the content data or the reproduction control information in the recording medium, the display apparatus 300 according to the present embodiment controls the process in accordance with a cause of the stoppage.

The display apparatus 300 according to the present embodiment may include a display function which makes it possible to cause the content data to be displayed based on the execution information. More specifically, the display apparatus 300 according to the present embodiment may be a projector, a display, etc. for example.

The content data according to the present embodiment are, for example, image data, video data, etc. The image data to be the content data may be image data including one sheet of image, for example, or may be image data sets including multiple sheets of image. The content data according to the present embodiment may be data which can be caused to be displayed on the display apparatus 300.

In the following explanation of the present embodiment, the content data reproduced in the display apparatus 300 are called "reproduction content data", while other content data, such as those which are stored in a predetermined storage region, for example, are merely called "content data". Moreover, in the following explanation of the present embodiment, the display apparatus 300 is explained, for a case in which a projector projects the content data onto a screen, with the projector and the screen as the display apparatuses.

Figure 2:
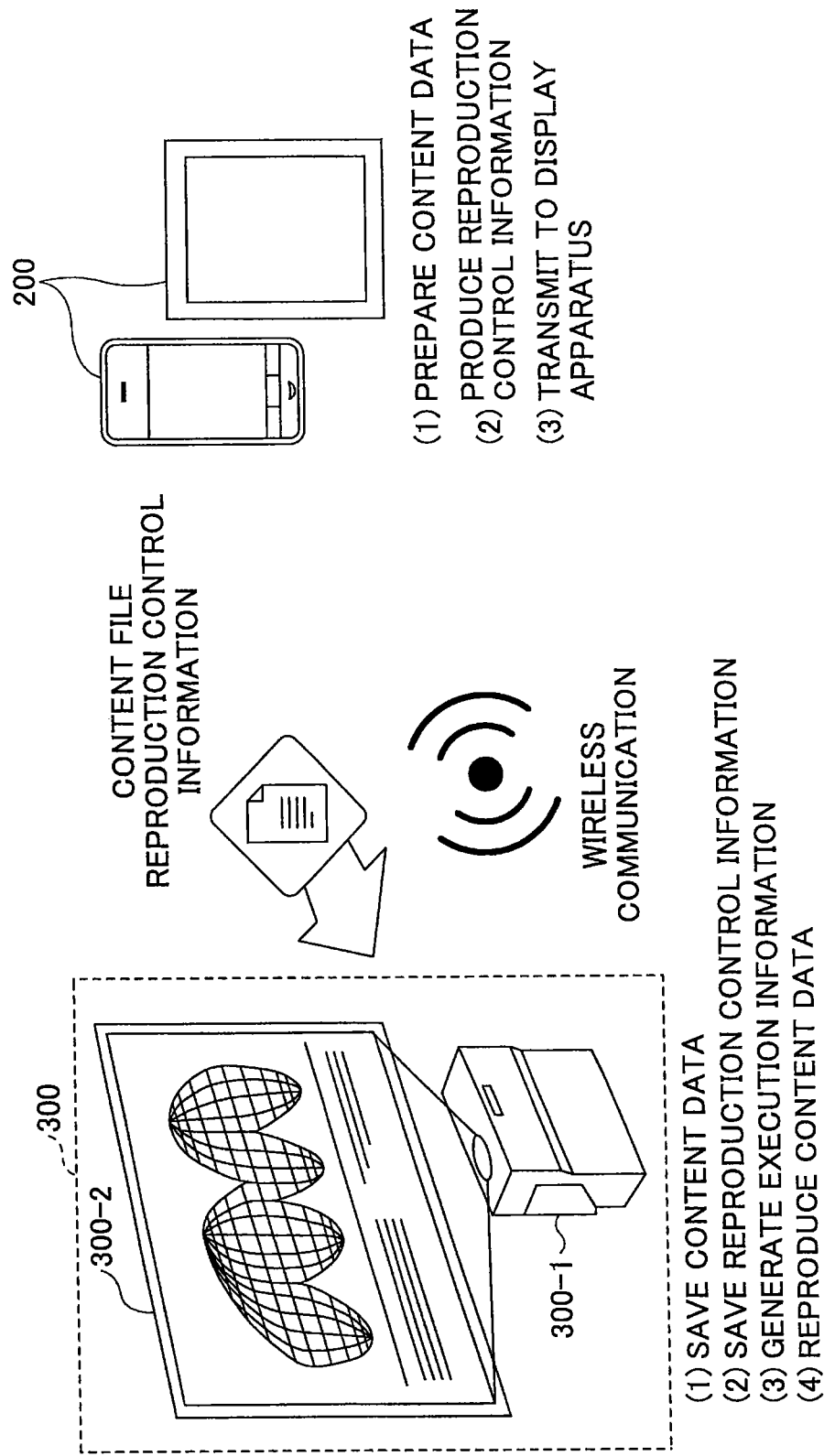
FIG. 2 is a diagram for explaining one example of a usage scene of the display system according to the present embodiment.

Below, a usage scene of the display system 100 according to the present embodiment is explained with reference to FIG. 2. FIG. 2 is a diagram for explaining one example of the usage scene of the display system according to the present embodiment.

In the example in FIG. 2, a case shown in which the information terminal 200 is configured as a smartphone or a tablet PC; the display apparatus 300 is configured to include a projector 300-1 and a screen 300-2; and the display system 100 is used for digital signage, for example.

Upon a user setting how to reproduce reproduction content data, the information terminal 200 according to the present embodiment generates reproduction control information of the reproduction content data based on this setting. Then, the information terminal 200 transmits the reproduction content data and the reproduction control information to the projector 300-1. The projector 300-1 saves received reproduction content data in a storage unit, generates execution information from the reproduction control information, and reproduces the reproduction content data in accordance with this execution information.

The display system 100 according to the present embodiment makes it possible for the user to transmit the reproduction content data and the reproduction control information once to continually reproduce the reproduction content data in accordance with settings desired.

In other words, when the display system 100 according to the present embodiment is applied to the digital signage, etc., the content data are automatically reproduced as desired by the user, making it possible for the user to save time and trouble of setting display switching, an order of displaying the content data, etc., each time.

Moreover, when a process is stopped in the process of saving the reproduction content data and the reproduction control information received from the information terminal 200 by the projector 300-1 into a storage unit, the display system 100 according to the present embodiment controls the saving process in accordance with a cause of the stopping. In other words, when the saving process is stopped during the saving process, the display system 100 according to the present embodiment conducts a control of whether to continue the saving process or delete the saved information in accordance with the cause of the stoppage. This makes it possible for the display system 100 according to the present embodiment to prevent incomplete data from being left in a storage region.

Figure 3:
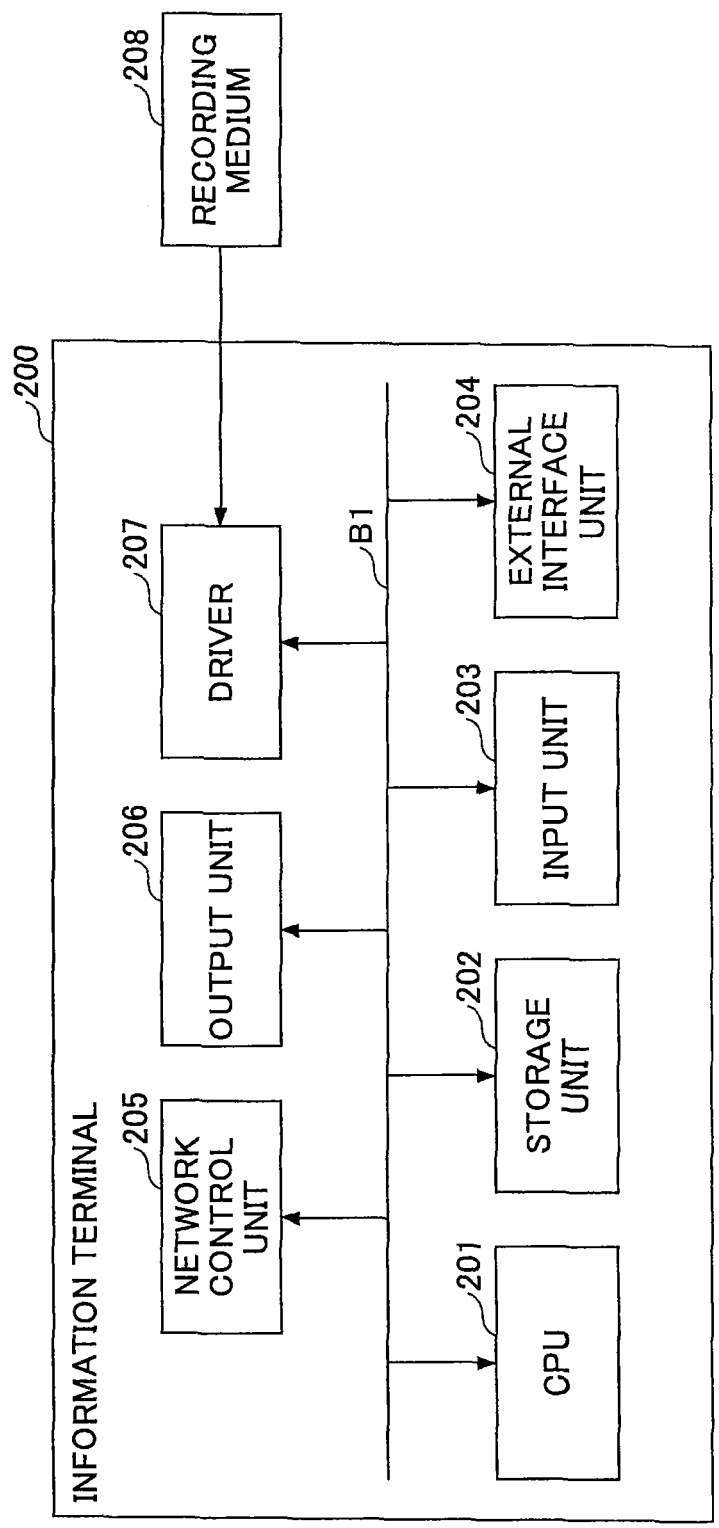
FIG. 3 is a diagram for explaining one example of a hardware configuration of an information system included in the display system according to the present embodiment.

Next, a hardware configuration of the information terminal 200 included in the display system 100 is explained with reference to FIG. 3. FIG. 3 is a diagram for explaining one example of a hardware configuration of an information terminal included in a display system according to the present embodiment.

The information terminal 200 according to the present embodiment includes a CPU (Central Processing Unit) 201, a storage unit 202, an input unit 203, an external interface unit 204, a network controller 205, an output unit 206, and a driver 207 that are mutually connected via a bus B1.

The CPU 201 controls various operations of the information terminal 200. The storage unit 202 stores thereon various information sets related to processes and operations of the information terminal 200, various programs executed in the information terminal 200, etc. The input unit 203 is used for inputting various signals and information. The input unit 203 may include a display function such as a touch panel, etc., for example. Moreover, the input unit 203 according to the present embodiment may be a pointing device, a keyboard, etc., for example.

The external interface unit 204 according to the present embodiment may be a USB (universal serial bus) memory slot, NFC (near-field communication). etc., for example. The network control unit 205, which includes a modem, a LAN card, etc., is used for connecting to the network. The output unit 206 is used for outputting various information sets from the information terminal 200. The output unit 206 according to the present embodiment may be, for example, a display, etc., or may be a transmitting unit which transmits various data sets to an external apparatus.

The program 200A according to the present embodiment is at least a part of various programs which control the information terminal 200. The program 200A is provided by distribution of the recording medium 208, downloading from a network, etc., for example. The recording medium 208, which has recorded thereon the program 200A, may use various types of recording media such as a semiconductor memory which electrically records information, such as a CD-ROM, a flexible disk, a ROM, a flash memory, etc.

Moreover, when the recording medium 208 having recorded thereon the program 200A is set in the driver 207, the program 200A is installed in the storage unit 202 via the driver 207 from the recording medium 208.

The storage unit 202 stores the installed program 200A as well as necessary files, data, etc. The CPU 201 implements various processes in accordance with the program 200A stored in the storage unit 202.

Figure 4:
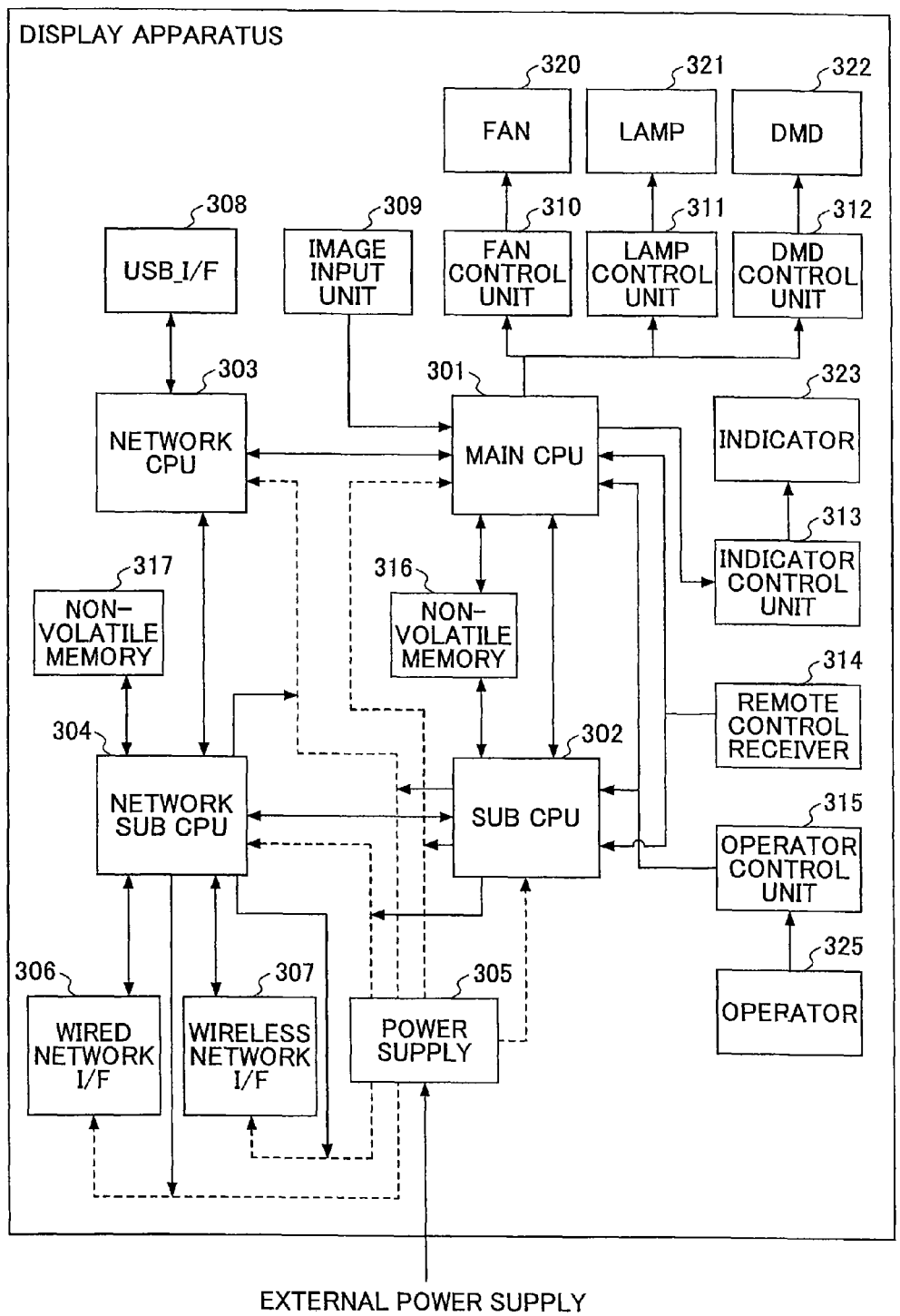
FIG. 4 is a diagram for explaining one example of a hardware configuration of a display apparatus included in the display system according to the present embodiment.

Next, a hardware configuration of the display apparatus 300 included in the display system 100 is explained with reference to FIG. 4. FIG. 4 is a diagram showing one example of a hardware configuration of a display apparatus included in a display system according to the present embodiment.

The display apparatus 300 according to the present embodiment includes, as control units, four CPUs: a main CPU 301, a sub CPU 302, a network CPU 303, and a network sub CPU 304. Below-described operations of the respective CPUs are implemented by the CPU executing various programs to control various hardware units. The program 300A is at least a part of the above-described various programs. The program 300A is provided by distribution of the recording medium, downloading from a network, etc., for example. Moreover, when the recording medium having recorded thereon the program 300A is set in the display apparatus 300, the program 300A is installed in a non-volatile memory 316 and a non-volatile memory 317 of the display apparatus 300 via the recording medium. The program 300A, which is downloaded from the network, is installed in the non-volatile memory 316 via a wired network I/F 306 or a wireless network I/F 307.

The main CPU 301, which is a main control unit, includes a function of controlling a DMD (digital mirror device) 322 to project video based on an image signal input from an image input unit 309 or the network CPU 303. While a DMD control unit 312 directly controls the DMD, the main CPU 301 may provide an image signal to be projected and setting data for use in the projection to the DMD control unit 312 to cause the DMD 322 to project a desired image.

The main CPU 301 also includes a function of performing signal processes on the input image signal that adjusts characteristics including contrast and hue before the projection. The above-described projection itself may also be considered one of the signal processes.

Moreover, the main CPU 301 includes a function of controlling a lamp 321 for use in projecting the video and a fan 320 for use in cooling the lamp 321 via a fan control unit 310 and a lamp control unit 311. The main CPU 301 also includes a function of controlling an indicator 323 including an LED (light-emitting diode) lamp, a small liquid crystal panel, etc. and indicating therein desired information.

Moreover, the main CPU 301 also includes a function of detecting, via an operator control unit 315, an operation conducted on an operator 325 including a button, a switch, etc., and detecting a signal indicating the operation content of a remote controller that is received by a remote control receiver 314.

Moreover, other than what is described herein, the main CPU 301 generally serves what is not served by other CPUs of control processes in the display apparatus 300. The main CPU 301, which includes these various functions, has relatively large power consumption. Therefore, in a standby state in which the power consumption is to be reduced, the main CPU 301 basically has the power supply thereto turned off. In the standby state in which the power consumption is to be reduced, the main CPU 301 may also have the power supplied in an amount not exceeding a predetermined amount.

Next, the sub CPU 302, which is a secondary control unit, includes a function of detecting operations via the remote control receiver 314 and the operator control unit 315. Moreover, it also includes a function of controlling on/off of power supplied to the main CPU 301 and the network sub CPU 304 in response to requests from the main CPU 301 and the network sub CPU 304 and the power supply on/off operations detected.

Then, the sub CPU 302 generally includes these functions only, so that the sub CPU 302 has extremely low power consumption. The sub CPU 302 detects a user operation even when the power supplied to the main CPU 301 is turned off, so that the power supply is always turned on while the power is being supplied from an external power supply to the power supply unit 305.

The network CPU 303 is a first network control unit. The network CPU 303 has a function of converting data (reproduction content data, etc.) to be projected that is read from a USB memory, which is an external recording medium connected to an USB_I/F (universal serial bus interface) 308, and data to be projected that is received from an external apparatus via a network, which data are received via the network sub CPU 304, into an image signal of a format suitable for the main CPU 301 to use for projection. Moreover, the network CPU 303 also includes a function of outputting a converted signal to the main CPU 301.

The burden of these operations performed by the network CPU 303 is relatively high, so that the network CPU 303 has relatively high power consumption as it processes such operations at high speed.

The network sub CPU 304 is a second network control unit. Then, it has a function of communicating with an external apparatus via a network and delivering data to be projected that are received from the external apparatus via the network to the network CPU 303. The display apparatus 300 includes, as interfaces for network communication, a wired network I/F 306 for conducting wired communication; and a wireless I/F 307 for conducting wireless communication. The former is an interface for conducting communication in accordance with IEEE ((Institute of Electrical and Electronics Engineers) 802.11b/11a/11n schemes, for example. The network sub CPU 304 may conduct communication with the external apparatus via the network using one or both of these.

Moreover, the network sub CPU 304 includes a function of controlling on/off of power supply to the wired network I/F 306 and the wireless network I/F 307 in accordance of the I/F setting for use in communication.

Moreover, the network sub CPU 304, functioning as a supply control unit, also includes a function of controlling on/off of supplying power to the network CPU 303 in response to detecting an event which instructs a transfer from a standby state to a power supply on state or an event which instructs, in the reverse direction, a transfer from the power supply on state to the standby state.

Next, the power supply unit 305 includes a function of supplying power supplied from an external power supply such as a home power supply, etc., which is connected from a power supply cable, to the respective units of the display apparatus 300. FIG. 4 indicates, in broken lines, power supply paths to representative destinations to be supplied of the main CPU 301, the sub CPU 302, the network CPU 303, the network sub CPU 304, the wired network I/F 306, and the wireless network I/F 307. Then, the on/off of the power supplied to at least these respective units can be switched separately. Moreover, power from the power supply unit 305 is supplied to the other respective units (not shown).

Furthermore, the solid arrows directed to the power supply path indicate that on/off of the power supply through the power supply path can be controlled. The sub CPU 302 can control the on/off of the power supply to the main CPU 301, the network CPU 303, and the network sub CPU 304.

The network sub CPU 304 can control the on/off of the power supply to the network CPU 303, the wired network I/F 306, and the wireless network I/F 307.

Moreover, while not shown, the main CPU 301 and the network CPU 303 can transmit a predetermined signal to the power supply unit 305 to block the power supplying path to them to turn off the power supplying.

Moreover, as for the respective units other than those units described in the above, an USB_I/F 308 is an interface for connecting an external apparatus compliant with the USB standards.

An image input unit 309 includes a function of accepting input of an image signal from an external apparatus in accordance with appropriate standards such as DVI-I (Digital Visual Interface Integrated), VGA (Video Graphics Array), RS-232C, etc.

A non-volatile memory 316 is a non-volatile storage unit which can be accessed from both the main CPU 301 and the sub CPU 302. For example, it may be configured with an EEPROM (Electrically Erasable Programmable Read-Only Memory). This non-volatile memory 316 has stored thereon setting information, operation history, etc., of the display apparatus 300. The setting information to be stored here includes settings on the degree of saving energy and settings on turning on the power supply. Moreover, settings related to communication include settings on an interface for use in communication; whether to use a DHCP (Dynamic Host Configuration Protocol) server for network communication; a gateway address, etc.

Moreover, the non-volatile memory 317 is a non-volatile storage unit which can be accessed from the network sub CPU 304. This non-volatile memory 317 has stored thereon at least setting information to be accessed when the network sub CPU 304 conducts communication via the network. The content of the setting information is to be synchronized between the non-volatile memory 316 and the non-volatile memory 317 when at least all of the network sub CPU 304, the network CPU 303, and the main CPU 301 are in operation.

The content of the non-volatile memory 316 is changed in accordance with the change operation accepted by the main CPU 301 through the remote control receiver 314 and the operator 325, while the content of the non-volatile memory 317 is changed in accordance with the change operation in accordance with the PJLink standards protocol that is accepted via the network by the network sub CPU 304. However, if the content of one of the non-volatile memories is changed, the changed content is speedily reflected into the other non-volatile memory. This operation is served by the network sub CPU 304, the network CPU 303, and the main CPU 301.

It is not necessary to store, into the non-volatile memory 317, all items of information that are stored in the non-volatile memory 316. The display apparatus 300 operates without any problems as long as at least items of setting information that the network sub CPU 304 seek to communicate. However, all items which can be edited in accordance with a change operation accepted via the network may be stored to edit the setting content via the network even in the standby state in which the main CPU 301 is being stopped and therefore improve the convenience.

Figure 5:
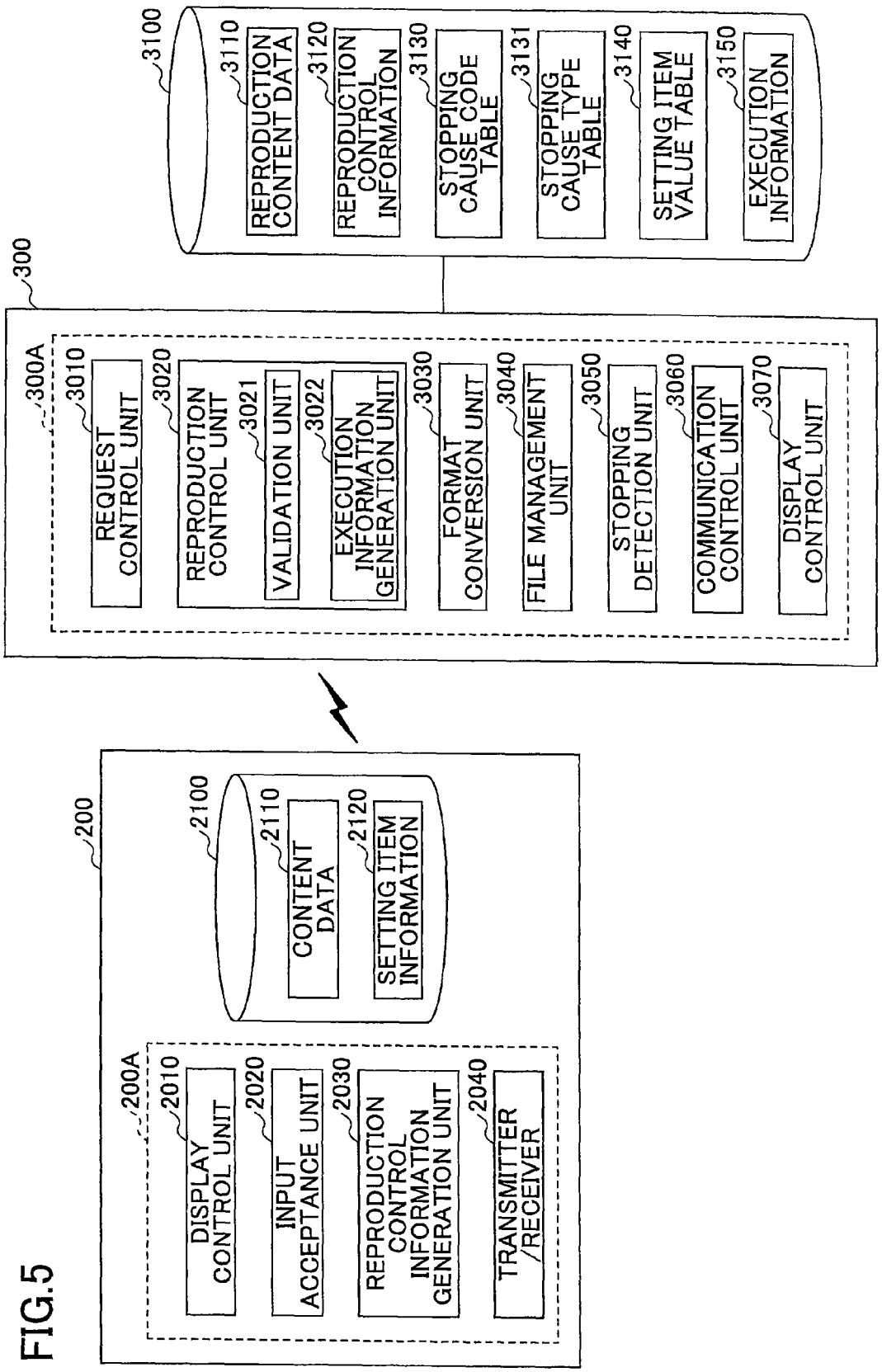
FIG. 5 is a diagram for explaining one example of a functional configuration of respective apparatuses included in the display system according to the present embodiment.

Next, a functional configuration of respective apparatuses included in the display system 100 according to the present invention is explained with reference to FIG. 5. FIG. 5 is a diagram explaining one example of the functional configuration of the respective apparatuses included in a display system according to the present embodiment.

The information terminal 200 according to the present embodiment includes a predetermined storage region 2100 provided within the storage unit 202. The storage region 2100 has stored therein content data 2110 and setting item information 2120, for example. The content data 2110, which are data displayable onto the display apparatus 300, for example, are image data, video data, etc. The setting item information 2120 according to the present embodiment is information which indicates items set by a user in reproduction control information.

The setting item information 2120 includes, an Order item which indicates a reproduction order of the content data 2110 included in reproduction content data 3110, for example. Moreover, the setting item information 2120 includes a Time item which indicates a reproduction time of the content data 2110 included in the reproduction content data 3110, for example. Furthermore, the setting item information 2120 includes an Effect item which indicates how to switch a display of the content data 2110 included in the reproduction content data 3110, for example.

Moreover, the information terminal 200 according to the present embodiment includes a display control unit 2010, an input acceptance unit 2020, a reproduction control information generation unit 2030, and a transmitter/receiver 2040.

The display control unit 2010 according to the present embodiment causes a listing screen of the content data 2110, a setting screen for setting values of items included in setting item information 2120, etc., to be displayed on a display, which is the output unit 206 of the information terminal 200.

The input acceptance unit 2020 according to the present embodiment accepts a selection of the content data 2110 in the listing screen on which is displayed a listing of the content data 2110. According to the present embodiment, the content data 2110 selected in the listing screen of the information terminal 200 is transmitted to the display apparatus 300 as reproduction content data 3110 to be reproduced in the display apparatus 300. Moreover, the input acceptance unit 2020 according to the present embodiment accepts an input of a setting value in a setting screen for setting a value of an item included in the setting item information 2120.

The reproduction control information generation unit 2030 according to the present embodiment generates reproduction control information 3120 according to a predetermined format based on information included in the reproduction content data. According to the present embodiment, the item included in the setting item information 2120 is a part of items included in the reproduction control information 3120. In other words, a value set by the user for the item included in the setting item information 2120 is included in the reproduction control information 3120 according to the present embodiment.

The transmitter/receiver 2040 according to the present embodiment transmits the reproduction content data 3110 and generated reproduction control information 3120 to the display apparatus 300. Moreover, a completion report, etc., which indicates that saving of the reproduction content data 3110 has been completed, for example, is received from the display apparatus 300.

While the content data 2110 are stored in the storage region 2100 in the information terminal 200 according to the present embodiment, it is not limited thereto. The content data 2110 may be stored, for example, in a portable recording medium which is readable by the information terminal 200 or in an external apparatus which can communicate with the information terminal 200.

The display apparatus 300 according to the present embodiment includes a request control unit 3010, a reproduction control unit 3020, a format conversion unit 3030, a file management unit 3040, a stopping detection unit 3050, a communication control unit 3060, and a display control unit 3070. Moreover, the reproduction control unit 3020 includes a validation unit 3021 and an execution information generation unit 3022.

Furthermore, the display apparatus 300 according to the present embodiment includes a storage region 3100 in which are stored the reproduction content data 3110, the reproduction control information 3120, a stopping cause code table 3130, a stopping cause type table 3131, a setting item value table 3140, and the execution information 3150. The storage region 3100 according to the present embodiment may be provided, for example, in the non-volatile memory 316 and/or the non-volatile memory 317 included in the display apparatus 300, or in a portable recording medium which can be read by the display apparatus 300. Moreover, the storage region 3100 may be provided in an external apparatus, etc., which can communicate with the display apparatus 300.

The stopping cause code table 3130 according to the present embodiment, which is a table accessed by the stopping detection unit 3050, has associated therein a stopping cause of a file saving process and a stopping cause type code which is assigned to the stopping cause.

The stopping cause type table 3131 according to the present embodiment, which is a table accessed by the request control unit 3010, has associated a stopping cause type code and a type of file saving process.

The setting item value table 3140 according to the present embodiment is a table which defines a default value of each item set in the reproduction control information 3120.

The execution information 3150 according to the present embodiment is the reproduction control information 3120 provided in a format executable by the display apparatus 300.

Upon accepting various requests such as a request for projection execution, a request for file saving, etc., via the communication control unit 3060, the request control unit 3010 according to the present embodiment analyzes the accepted request and makes a request for a process corresponding to this request to a different processing unit.

If a request for projection execution is accepted via the communication control unit 3060 from the information terminal 200, for example, the request control unit 3010 according to the present embodiment makes a request for a projection execution process to the reproduction control unit 3020. Moreover, if a request for file saving is accepted via the communication control unit 3060 from the information terminal 200, for example, the request control unit 3010 makes a request for a file saving process to the file management unit 3040.

Furthermore, if a process stopping cause occurs while the file saving process is being executed, for example, the request control unit 3010 according to the present embodiment accesses the stopping cause type table 3131 and performs the file saving process in accordance with the stopping cause type code reported from the stopping detection unit 3050.

The reproduction control unit 3020 according to the present embodiment controls reproduction of the reproduction content data 3110 based on the execution information 3150. Moreover, the validation unit 3021 validates whether the reproduction control information 3120 is appropriate. Moreover, the execution information generation unit 3022 performs a process of generating the execution information 3150 from the reproduction control information 3120.

The format conversion unit 3030 according to the present embodiment performs a process converting the content data 2110 included in the reproduction content data 3110 into a format which can be projected by the display control unit 3070.

The file management unit 3040 according to the present embodiment performs a process of saving, into the storage region 3100, the reproduction control information 3120 and the reproduction content data 3110 transmitted from the information terminal 200. Moreover, it performs a process of reading a file, etc., that are stored in the storage region 3100.

The stopping detection unit 3050 according to the present embodiment detects occurrence of the stopping cause of the file saving process into the storage region 3100 by the file management unit 3040. The stopping cause of the file saving process according to the present embodiment is, for example, a standby transfer, etc., which occurs during the file saving process.

Moreover, the stopping detection unit 3050 accesses the stopping cause code table 3130, obtains and reports, to the request control unit 3010, a stopping cause type code in accordance with the detected stopping cause type.

The communication control unit 3060 according to the present embodiment conducts control of communications with the information terminal 200.

The display control unit 3070 according to the present embodiment controls projection of the reproduction content data 3110 onto the screen 300-2.

Now, a process request made from the information terminal 200 to the display apparatus 300 is described.

FIGS. 6A to 6C are diagrams explaining one example of a process request from the information terminal to the display apparatus according to the present embodiment. According to the present embodiment, as the process request from the information terminal 200 to the display apparatus 300, a case is described of using a HTTP (HyperText Transfer Protocol) request as one example. Moreover, the display apparatus 300 is to use the HTTP response as a response to the above-described process request.

FIG. 6A is a table showing a corresponding relationship among the type of the process request received from the information terminal 200 by the display apparatus 300; the HTTP method; and URI (Uniform Resource Identifier). FIG. 6A shows, as one example, request for projection execution; and request for saving file to recording medium as request type. If it is a request for projection execution, for example, an HTTP request in which are designated "PUT" as the http method and a character sequence starting with "/service/projection" as the URI is transmitted from the information terminal 200 to the display apparatus 300. Moreover, if it is a request for saving a file to recording medium, for example, an HTTP request in which are designated "POST" as the http method and a character sequence starting with "/service/storage" as the URI is transmitted from the information terminal 200 to the display apparatus 300. The request control unit 3010 of the display apparatus 300 accesses the above-described corresponding relationship among the request type, the HTTP method, and the URI, and determines the request type from the values of the HTTP method and the URI of the HTTP request received from the information terminal 200.

FIG. 6B is an example of the HTTP request for the request for projection execution transmitted from the information terminal 200 to the display apparatus 300. For the HTTP request is shown, as one example, a configuration which may include a request line, a header, and a body. For the HTTP response is shown, as one example, a configuration which may include a status line, a header, and a body.

In the HTTP request is described, on the request line 411, "PUT" designated as the HTTP method and "/service/projection/1" designated as the URI, indicating that the HTTP request is a request for projection execution. "Type": "playlist", which is described on the body 413, indicates that it is a request for projection execution using the reproduction control information 3120. Moreover, "path":"/QS/Playlist_1/playlist.json", which is described on the body 413, indicates that it is a storage destination for the reproduction control information 3120. "Host:projector.example.jp", which is described on the header 412, indicates that it is an address for the display apparatus 300. "Content-Type: application/json", which is described on the header 412, indicates that the reproduction control information 3120 is a file having a JSON format.

On the status line 414 of the HTTP response is designated "200 OK" as an HTTP status code, indicating that the display apparatus 300 has accepted the request for projection execution. When the display apparatus 300 is not able to accept the request for projection execution due to some error, etc., it may be arranged to designate a HTTP status code indicating that an error has occurred.

Upon accepting the request for projection execution as described above, the display apparatus 300 generates the execution information 3150 from the reproduction control information 3120 designated on the body 413 of the HTTP request and projects the designated reproduction content data 3110 onto the screen 300-2.

FIG. 6C is one example of the HTTP request for the request for file saving that is transmitted from the information terminal 200 to the display apparatus 300 and the HTTP response transmitted from the display apparatus 300 to the information terminal 200.

In the HTTP request is described, on the request line 421, "POST" designated as the HTTP method and "/service/storage/files/usb1/QS/Playlist_1/file_1.jpeg" designated as the URI, indicating that the HTTP request is a request for file saving. In this example, it is designated that saving is made with a file name of "file_1.jpeg" in a storage destination "/QS/Playlist_1/" of the USB memory as the recording medium.

Moreover, for "<binary data>", which is described on the body 423, file data to be saved are designated. For example, binary data for image data (for example, JPEG format) are designated. "Host:projector.example.jp", which is described on the header 422, indicates that it is an address for the display apparatus 300. "Content-Type:application/octet-stream", which is described on the header 422, indicates that the file data to be saved is binary data.

On the HTTP response status line 424 is designated "201 Created" as the HTTP status code indicating that the display apparatus 300 has completed the file saving. When the display apparatus 300 is not able to accept the request for file saving due to some error, etc., it may be arranged to designate a HTTP status code indicating that an error has occurred. "Content-length" indicates a length (in number of bytes) of the content (the body of the HTTP response). In this example, the body is not described, so that the value of the Content-Length is zero. "Location" indicates a storage destination of a file designated in the request for file saving.

Upon receiving the request for file saving as described above, the display apparatus 300 saves what is designated in the request for file saving (e.g., the reproduction content data 3110 and the reproduction control information 3120) in the recording medium designated.

While a case is described in the above for using HTTP as the requests for projection execution and for file saving, it is not limited thereto.

Next, a directory configuration of a recording medium in the display apparatus 300 is described.

FIG. 7 is a diagram for explaining one example of a directory configuration of a recording medium of the display apparatus according to the present embodiment. As described above, upon accepting the request for file saving from the information terminal 200, the display apparatus 300 saves the designated file into the recording medium. The recording medium has a directory configured by a file system such as FAT (File Allocation Table), NTFS (NT File System), etc., for example. In FIG. 7 is shown that there is a folder with a name of "QS" immediately under the recording medium (for example, a USB memory), within which folder there are folders with names of "Playlist1" and "Playlist_2". Moreover, it is shown that there are files of JPEG and JSON formats within "Playlist_1" and "Playlist_2". The file of the JPEG format is, for example, the content data 2110 included in the reproduction content data 3110, and image data. Moreover, the file of the JSON format is, for example, the reproduction control information 3120. Details of the reproduction control information 3120 are described below.

Next, the process of file saving in the display apparatus according to the present embodiment is described.

Figure 8:
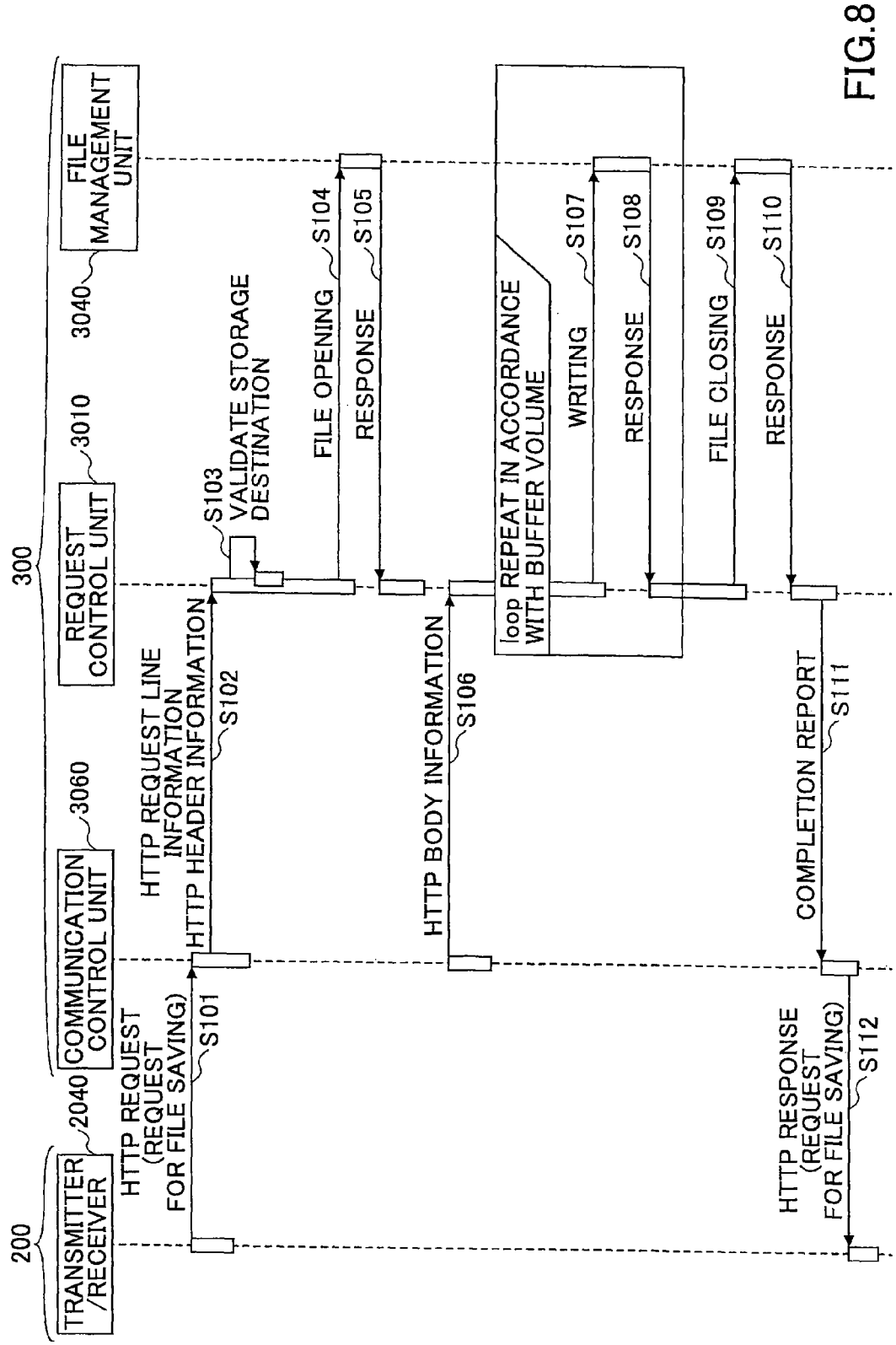
FIG. 8 is an exemplary sequence diagram of a process of file saving in the display apparatus according to the present embodiment.

FIG. 8 is an exemplary sequence diagram of a process of file saving in the display apparatus according to the present embodiment.

Upon accepting an HTTP request (a request for file saving) transmitted by the transmitter/receiver 2040 of the information terminal 200 (step S101), the communication control unit 3060 of the display apparatus 300 transmits the request line 421 and the header 422 to the request control unit 3010 (step S102). The request control unit 3010 determines that the received HTTP request is a request for file saving from the HTTP method and the URI designated on the request line 421, and validates the file storage destination designated in the URI (step S103). The validation of the file storage destination designated in the URI includes validation that the storage destination is less than or equal to a predetermined number of characters (e.g., less than or equal to 255 characters), for example; that the storage destination folder layer is less than or equal to a predetermined number; whether there is the designated storage destination, etc.

The request control unit 3010 makes a request for file opening for the storage destination designated in the URI (step S104). The file management unit 3040 performs the process of opening the file applicable and responds to the request control unit 3010 that the process of opening the file has been completed. Here, the process of opening the file is a process of starting writing of data included in the file into the storage region 3100.

Next, the communication control unit 3060 transmits the body 423 of the HTTP request to the request control unit 3010 (step S106). Upon receiving the body 423 of the HTTP request, the request control unit 3010 makes a request for writing the file designated on the body 423 to the file management unit 3040 (step S107). The file management unit 3040 saves the file designated on the body 423 into the file opened in steps S104-S105 and responds to the request control unit 3010 that writing has been completed (step S108).

The process of writing the file in the above-described steps S107-S108 may be performed using multiple buffers. In other words, for example, first the body 423 of the HTTP request is received in a buffer A, and, when the volume of the buffer A is filled, the body 423 of the HTTP request is then received in a buffer B. Then, a process is performed of writing the content of the buffer A into the designated storage destination. Thereafter, when the volume of the buffer B is similarly filled, the body 423 of the HTTP request is received in the buffer A, and the content of the buffer B is written into the designated storage destination. As described above, the process of steps S107-S108 may be repeated for each buffer to efficiently receive a large volume of data to perform the process of file saving.

Next, the request control unit 3010 performs a request for closing the file opened in steps S104-S105 (step S109), and the file management unit 3040 performs a closing process and responds that the process of file closing has been completed to the request control unit 3010 (step S110). Then, the request control unit 3010 reports that the process of file saving has been completed to the communication control unit 3060 (step S111). The communication control unit 3060 transmits an HTTP response indicating that the request for file saving has been completed to the transmitter/receiver 2040 of the information terminal (step S112). Here, the process of closing the file is a process of finishing writing of data included in the file into the storage region 3100.

When there already exists a file B with the same name as a file A for which the process of file saving is being performed, it is preferable to change the file A to a name different from that of the file B to perform a writing process in step S107. Moreover, upon completing the process of writing the file A, it is preferable to delete file B and change the file name of the file A back to the original one. This makes it possible to prevent the file B from being overwritten until the process of writing data of the file A is fully completed.

As described above, the display apparatus 300 may save the reproduction content data 3110, the reproduction control information 3120, etc., that are transmitted from the information terminal 200 to the storage region 3100.

Next, an operation is described of the display apparatus 300 when, during a file saving process, the saving process is stopped. This makes it possible to prevent incomplete data (a file for which writing of some of data thereof has not been completed) from being left in the storage region 3100.

FIG. 9 is an exemplary sequence diagram of a process when the process of file saving is stopped in the display apparatus according to the present embodiment.

Upon detecting an occurrence of a stopping cause during the process of file saving, the stopping detection unit 3050 reports that the occurrence of the stopping cause has been detected to the request control unit 3010 (step S201). Then, the stopping detection unit 3050 accesses the below-described stopping cause code table 3130 and reports a stopping cause type code in accordance with the stopping cause detected to the request control unit 3010. The request control unit 3010 according to the present embodiment may detect an occurrence of the stopping cause of the process of file saving when it is reported the stopping cause type code from the stopping detection unit 3050, for example.

The stopping cause of the process of file saving may include standby transfer and input switching due to shortage of power supply, shortage of available volume in the recording medium (for example, an USB memory, etc.), inaccessibility to the recording medium, etc. In the explanations below, a case is described, as one example, of the stopping cause being the standby transfer.

Upon detecting an occurrence of the stopping cause of the process of file saving, the request control unit 3010 makes a request for cancelling data transfer to the communication control unit 3060 (step S202). The cancelling of the data transfer is, for example, cancelling of transfer of the header 422 and the body 423 of the HTTP request. The communication control unit 3060 responds to the request control unit 3010 with a cancellation response indicating that data transfer has been cancelled (step S203). Then, the request control unit 3010 completes the process of file saving by an operation in accordance with timing of receiving the cancellation response and the stopping cause (step S204).

More specifically, upon receiving the cancellation response, the request control unit 3010 accesses the stopping cause type table 3131 and performs an operation in accordance with the stopping cause type code reported from the stopping detection unit 3050 in step S201 and timing of receiving the cancellation response.

According to the present embodiment, when timing of receiving the cancellation response is prior to the request control unit 3010 receiving the HTTP header 422 (timing 1), the request control unit 3010 completes the process of file saving without doing anything. In this case, data included in the file are not written into the storage region 3100, so that a circumstance in which incomplete data are left in the recording medium is prevented.

Next, when the timing of receiving the cancellation response is after completion of receiving the HTTP header 422 by the request control unit 3010 and before receiving the response that opening of the file of the designated storage destination has been completed (timing 2), the following process is performed. First, the request control unit 3010 waits for a response that opening of the file from the file management unit 3040 has been completed, and upon receiving the response (step S211), makes a request for file closing to the file management unit 3040 (step S212). Then, the request control unit 3010 receives a response that closing of the file has been completed from the file management unit 3040 (step S213) to finish the process of file saving. Even in this case, data included in the file are not written into the storage region 3100, so that a circumstance in which incomplete data are left in the recording medium is prevented.

Next, when the timing of receiving the cancellation response is on or after the process of step S105 in FIG. 8 and before the process of step S106 (timing 3), the request control unit 3010 performs the following process. More specifically, when it is after receiving the response that the file opening has been completed and before the completion of receiving the body 423 of the HTTP, the request control unit 3010 performs the following process.

First, when a request for data writing has already been made to the file management unit 3040, the request control unit 3010 waits for a response that the process of writing has been completed. Then, upon receiving the response that the process of writing has been completed (step S221), a request for file closing is made to the file management unit 3040 (step S222). When no request for writing has yet been made to the file management unit 3040, the request control unit 3010 does not execute the process of step S221.

Next, upon receiving a response of completion of file closing (step S223), the request control unit 3010 makes a request for file deletion to the file management unit 3040 (step S224). Then, upon receiving the file deletion response (step S225), the request control unit 3010 completes the process of file saving.

In this case, a request for writing is made for some of the data, so that incomplete data are left in the storage region 3100. Therefore, the incomplete data written are deleted to complete the process of file saving.

Next, when the timing of receiving the cancellation response is after completion of receiving the HTTP body 423 (timing 4), the request control unit 3010 completes the file saving process without doing anything. In this case, writing of all data into the storage region 3100 has been completed, so that a circumstance in which incomplete data are left in the storage region 3100 is prevented.

While a case is described in which the stopping cause of the process of file saving is standby transfer, various causes are possible for stopping. Moreover, according to the present embodiment, it is preferable to change the operation of the process of file saving of the display apparatus 300 in accordance with the stopping cause. In other words, the stopping detection unit 3050 according to the present embodiment detects an occurrence of the stopping cause to access the stopping cause code table 3130 and provides a report in accordance with the stopping cause to the request control unit 3010. The request control unit 3010 according to the present embodiment performs an operation in accordance with the timing of receiving the cancellation response of data transfer and the stopping cause to complete the file saving process.

Below, one example of a process of file saving in accordance with a stopping cause is explained using FIGS. 10A and 10B. FIGS. 10A and 10B are diagrams explaining exemplary stopping cause code table and stopping cause type table that are included by the display apparatus according to the present embodiment.

FIG. 10A is one example of the setting table 3130. The stopping cause code table 3130 has associated the stopping cause type code and the stopping cause type that indicate the stopping cause. For example, the stopping cause type code of "0001" is associated with the stopping cause type of "standby transfer". The stopping cause type code of "0002" is associated with the stopping cause type of "input switching". The stopping cause type code of "0003" is associated with the stopping cause type of "shortage of available volume in USB memory". The stopping cause type code of "0004" is associated with the stopping cause type of "inaccessibility to USB memory".

FIG. 10B is one example of the setting table 3131. The stopping cause type table 3131 has associated the stopping cause type code and the timing of receiving the data transfer cancellation response by the request control unit 3010 with an operation in the process of file saving of the request control unit 3010.

Upon detecting stopping of the process during the process of file saving, the stopping detection unit 3050 accesses the stopping cause code table 3130 and reports the stopping cause type code to the request control unit 3010 (step S201 in FIG. 9). In other words, the stopping detection unit 3050 accesses the stopping cause code table 3130 in FIG. 10A and reports any one of stopping cause type codes of "0001" to "0004" to the request control unit 3010 in accordance with the stopping cause.

The request control unit 3010 accesses the stopping cause type table 3131 in FIG. 10B and performs a process of file saving in accordance with timing of receiving the stopping cause type code and the timing of receiving the response that the data transfer has been cancelled.

In FIG. 10B, when the stopping cause type code is "0001" (standby transfer), the process is as shown in step S204 in FIG. 9. In other words, the request control unit 3010 performs an operation associated in the stopping cause type table 3131 in accordance with the timing (timing 1-4) of receiving the data transfer cancellation response.

In FIG. 10B, when the stopping cause type code is "0002" (input switching), the request control unit 3010 continues the process of file saving regardless of the timing of receiving the data transfer cancellation response. In other words, the request control unit 3010 causes the file management unit 3040 to continue writing of data into the storage region 3100. In this case, only input to the display apparatus 300 has been switched, so that a circumstance in which incomplete data are left is prevented. Input switching includes a case of switching an input from a network to an external input (for example, an input via an RGB cable or an HDMI (registered trademark) (High-definition multimedia interface). This makes it possible to obtain data from a different input channel while continuing the process of file saving.

In FIG. 10B, when the stopping cause type code is "0003" (shortage of available volume in USB memory), the request control unit 3010 performs a process of file saving in accordance with the timing (timings 1-4) of receiving the data transfer cancellation response. In other words, for the timing 1, the request control unit 3010 finishes the process of file saving without doing anything. In this case, no data are written into the storage region 3100, so that a circumstance in which incomplete data are left in the recording medium is prevented.

For the timing 2, the request control unit 3010 waits for a response that opening of the file has been completed from the file management unit 3040, and upon receiving the response, makes a request for file closing to the file management unit 3040. Then, the request control unit 3010 receives a response that closing of the file has been completed from the file management unit 3040 to finish the process of file saving. Even in this case, no data are written into the storage region 3100, so that a circumstance in which incomplete data are left in the recording medium is prevented.

For the timing 3, the request control unit 3010 makes a request for file closing to the file management unit 3040. Upon receiving a response of completion of file closing, the request control unit 3010 makes a request for file deletion to the file management unit 3040. Then, upon receiving the file deletion response, the request control unit 3010 completes the process of file saving. In this case, a request for writing into the storage region 3100 is made for some of the data, so that incomplete data are left in the storage region 3100. Therefore, the incomplete data written are deleted to complete the process of file saving.

For the timing 4, the same process as for the timing 3 is performed. In this case, there is a shortage of available volume in the USB memory, so that incomplete data are left in the storage region 3100.

In FIG. 10B, when the stopping cause type is "0004" (inaccessibility to USB memory), the request control unit 3010 finishes the process of file saving without doing anything. In this case, due to the inaccessibility to the USB memory, a circumstance in which incomplete data are left in the storage region 3100 is prevented. Incomplete data may be left in the storage region 3100 when the USB memory becomes inaccessible due to a removal of the USB memory from the display apparatus 300 during the process of file saving, for example. Even in this case, the request control unit 3010 finishes the process of file saving without doing anything.

As described above, the present embodiment makes it possible to change the operation of the process of file saving in accordance with the stopping cause of the process of file saving and the timing of receiving the data transfer cancellation response. What are described above for the stopping cause types and the operations for the process of file saving are exemplary, so that various stopping cause types and operations for the process of file saving are possible.

When the written file is deleted, it is preferable for the stopping detection unit 3050 or the request control unit 3010 to provide a report indicating that file saving has failed to the information terminal 200. Moreover, it is preferable to report, in conjunction therewith, a cause of the failure of the file saving (the above-described stopping cause, etc.) to the information terminal 200.

What is described in the above makes it possible for incomplete data being left in the storage region 3100 to be prevented even when the process is stopped during the process of file saving in the display apparatus 300.

Next, a process of the display apparatus 300 according to the present embodiment displaying the reproduction content data 3110 is described.

FIG. 11 is an exemplary sequence diagram of a projection execution process in the display apparatus according to the present embodiment.

Upon accepting an HTTP request (a projection execution request) transmitted by the transmitter/receiver 2040 of the information terminal 200 (step S301), the communication control unit 3060 of the display apparatus 300 transfers it to the request control unit 3010 (step S302). The request control unit 3010 analyzes the received HTTP request (step S303). In other words, the request control unit 3010 analyzes the request line 411 of the received HTTP request and determines from the values of the HTTP method and the URI that the received HTTP request is a projection execution request. Next, the request control unit 3020 validates a storage destination for the reproduction control information 3120 designated on the body 413 of the HTTP request (step S304).

Next, the request control unit 3010 transmits the projection execution request designating a file path of the storage destination of the reproduction control information 3120 from the body 411 of the HTTP request to the reproduction control unit 3020 (step S305). Based on the storage destination of the reproduction control information 3120 included in the received projection execution request, the reproduction control unit 3020 makes a request for obtaining the reproduction control information 3120 to the file management unit 3040 (step S306). The file management unit 3040 obtains the reproduction control information 3120 from the storage destination designated for the storage region 3100 and responds to the reproduction control unit 3020 that the obtaining has been completed (step S307).

Next, the reproduction control unit 3020 analyzes the reproduction control information 3120 and generates the execution information 3150 (step S308). Details of the process of this step S308 will be described below.

Next, the reproduction control unit 3020 requests conversion of the reproduction content data 3110 to the format conversion unit 3030 in accordance with the execution information 3150 generated in the process in step S308 (step S309). The format conversion unit 3030 converts the reproduction content data 3110 and makes a request for displaying the converted reproduction content data 3110 to the display control unit 3070 (step S310). Moreover, the format conversion unit 3030 responds that the conversion and displaying processes have been completed to the reproduction control unit 3020 (step S311). The process of the above-described steps S309 to S311 are repeatedly performed on the reproduction content data 3110 designated in the execution information 3150.

The conversion in above-described step S309 is a process of converting the reproduction content data 3110 (for example, image data of JPEG format) designated as the execution information 3150 into a format which can be projected by the display control unit 3070. The format which can by projected by the display control unit 3070 includes a YUV format. etc., for example.

Then, the reproduction control unit 3020 reports that displaying of the reproduction content data 3110 has been completed to the request control unit 3010 (step S312). The request control unit 3010 transfers this report to the communication control unit 3060 (step S313). The communication control unit 3060 transmits an HTTP response indicating that displaying based on the reproduction control information 3120 has been performed to the transmitter/receiver 2040 of the information terminal 300 (step S314).

The process of the above-described steps S312-S314 is performed without waiting for completion of the process of displaying all reproduction content data 3110 included in the execution information 3150.

As described above, the display apparatus 300 may generate the execution information 3150 based on the reproduction control information 3120 designated in this projection execution request in accordance with the projection execution request received from the information terminal 200 and display the reproduction content data 3110 in accordance with this execution information 3150. In this way, the display apparatus 300 may perform displaying in accordance with an order of displaying the reproduction content data 3110, time of displaying the reproduction content data 3110, an effect at the time of switching displaying of the reproduction content data 3110 that are designated in the information terminal 200.

For example, when the information terminal 200 makes a projection execution request when the power supply of the display apparatus 300 is not turned on or in case of a standby state, it is preferable to cause an error to be displayed in the information terminal 200.

Next, details of the process of step S308 for the above-described projection execution process are described. In the process in step S308, the reproduction control unit 3020 analyzes the reproduction control information 3120 and generates the execution information 3150.

According to the present embodiment, the reproduction control information 3120 is described in a JSON format as shown in FIG. 12. The JSON format is a lightweight data description language based on the object notation in JavaScript (registered trademark).

FIG. 12 is a diagram explaining exemplary reproduction control information according to the present embodiment.

In an example in FIG. 12, a value of the Version item is 1.0.0, a value of the Order item is 0, and the reproduction content data 3110 are lined up as values of the Contents_list item. Values of the Contents_list item are specifically, a value of the Path item, a value of the Time item, and a value of Effect item of the reproduction content data 3110. The Path item is a file path of a storage destination of the reproduction content data 3110. The Time item is a reproduction time (display time) of the reproduction content data 3110. The Effect item is a display mode at the time displaying of the reproduction content data 3110 is switched. In an example in FIG. 12, the Time item and the Effect item are not described as the first of the Contents_list item (no value is set by the information terminal).

Figure 13:
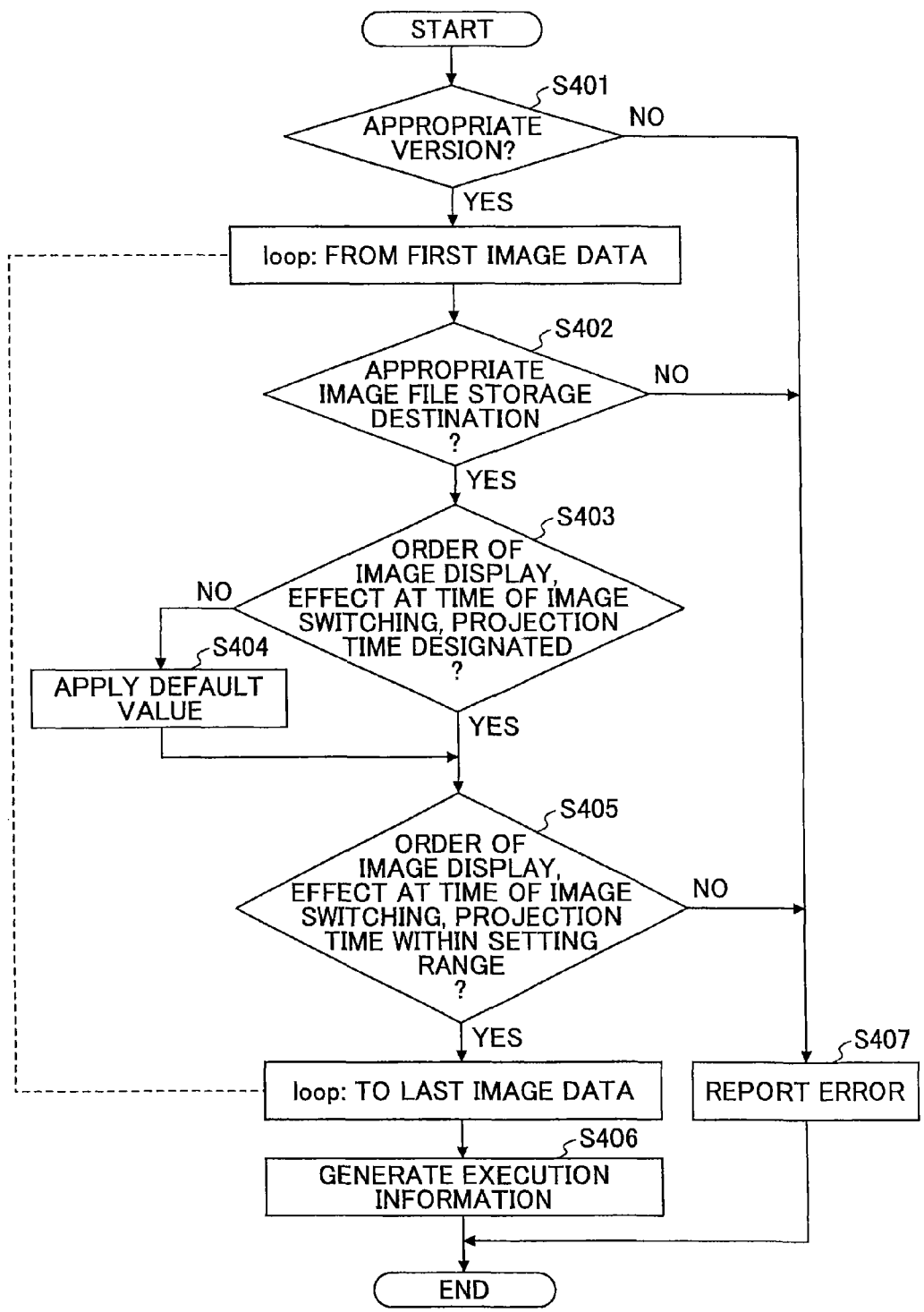
FIG. 13 is an exemplary flowchart of processes of analyzing the reproduction control information and generating execution information in the display apparatus according to the present embodiment.

FIG. 13 is an exemplary flowchart of processes of analyzing the reproduction control information and generating the execution information in the display apparatus according to the present embodiment.

The validation unit 3021 determines whether the value of the Version item in the reproduction control information 3120 is appropriate (step S401).

Next, for the reproduction content data 3110 designated as values of the Contents_list item, the validation unit 3021 performs steps S402-S405. First, the validation unit 3021 determines whether the value of the Path item is appropriate (step S402). In other words, it is determined, for example, that the value of the Path item is less than or equal to a predetermined number of characters (for example, less than or equal to 255 characters), that the Path item value layer is less than or equal to the predetermined number, whether there is a file in a storage destination designated as a value of the Path item, etc.

The validation unit 3021 determines whether the value of the Order item, the value of the Time item, and the value of the Effect item are designated (step S403). When any one of the value of the Order item, the value of the Time item, and the value of the Effect item is not designated, it proceeds to the process of step S404. If the value of the Order item, the value of the Time item, and the value of the Effect item are designated, it proceeds to the process of step S405.

In the process in step S404, when the value of the Time item or the value of the Effect item is not designated, the validation unit 3021 accesses the setting item value table 3140 and sets an initial value (default value) (step S404). FIG. 14 is a diagram explaining an exemplary setting item value table according to the present embodiment.

In FIG. 14, a setting range and an initial value are defined for Order, Time, and Effect items. The setting range indicates a range of values which may be set for each item. The initial value indicates a default value when not set for each item. In the Order item, for the setting range, "0: designation order", "1: reverse order", and "2: random" are defined, while 0 is defined for the initial value. In the Time item, it is defined that setting is possible in units of 1 second between 1 and 30 seconds as a setting range, while 5 seconds is defined for the initial value. In the Effect item, a setting range is defined of "0: fade in", "1: push to left", "2: push to right", "3: wipe to left", and "4: wipe to right", while "0: fade in" is defined for the initial value.

For the first reproduction content data 3110 designated for the Contents_list item of the reproduction control information 3120 shown in FIG. 12, values of Time item and Effect item are not designated. In this case, in the process of step S404, the setting item value table 3140 is accessed, and, for the values of the Time item and the Effect item, the respective default values of "5 seconds" and "0: fade in" are set.

In the process in step S405, for the values of the Order item, the Time item, and the Effect item, it is determined whether they are within the setting range (step S405). In other words, the setting item value table 3140 is accessed and it is determined whether, for the values of the Order item, the Time item, and the Effect item, they are a value within a predetermined range.

Finally, the execution information generation unit 3022 generates the execution information 3150 from the reproduction control information 3120 (step S406). The execution information 3150 is, for example, the reproduction control information 3120, which is provided in a format executable by the display apparatus 300. For example, it is data in a format shown in FIG. 15. It is a diagram explaining exemplary execution information according to the present embodiment. In FIG. 15, in the reproduction control information 3120 shown in FIG. 12, a default value is applied for items which have not been set. According to the present embodiment, the execution information 3150 has been described as having a JSON format. However, it is not limited thereto, so that the display apparatus 300 may convert to a different format which can be read by the display apparatus 300.

In the process in step 3401, the validation unit 3021 reports an error when the value of the number of layers of the value of Version item is not appropriate (step S407). In the process in step S402, the validation unit 3021 reports an error when the value of the Path item is not appropriate (step S407). In the process in step S405, the validation unit 3021 reports an error when the values of the Order, Time, and Effect items are not within a setting range (step S407).

As described above, the display apparatus 300 may determine whether the value of each item designated in the reproduction control information 3120 is appropriate, apply a default value as needed, and generate execution information 3150.

Figure 16:
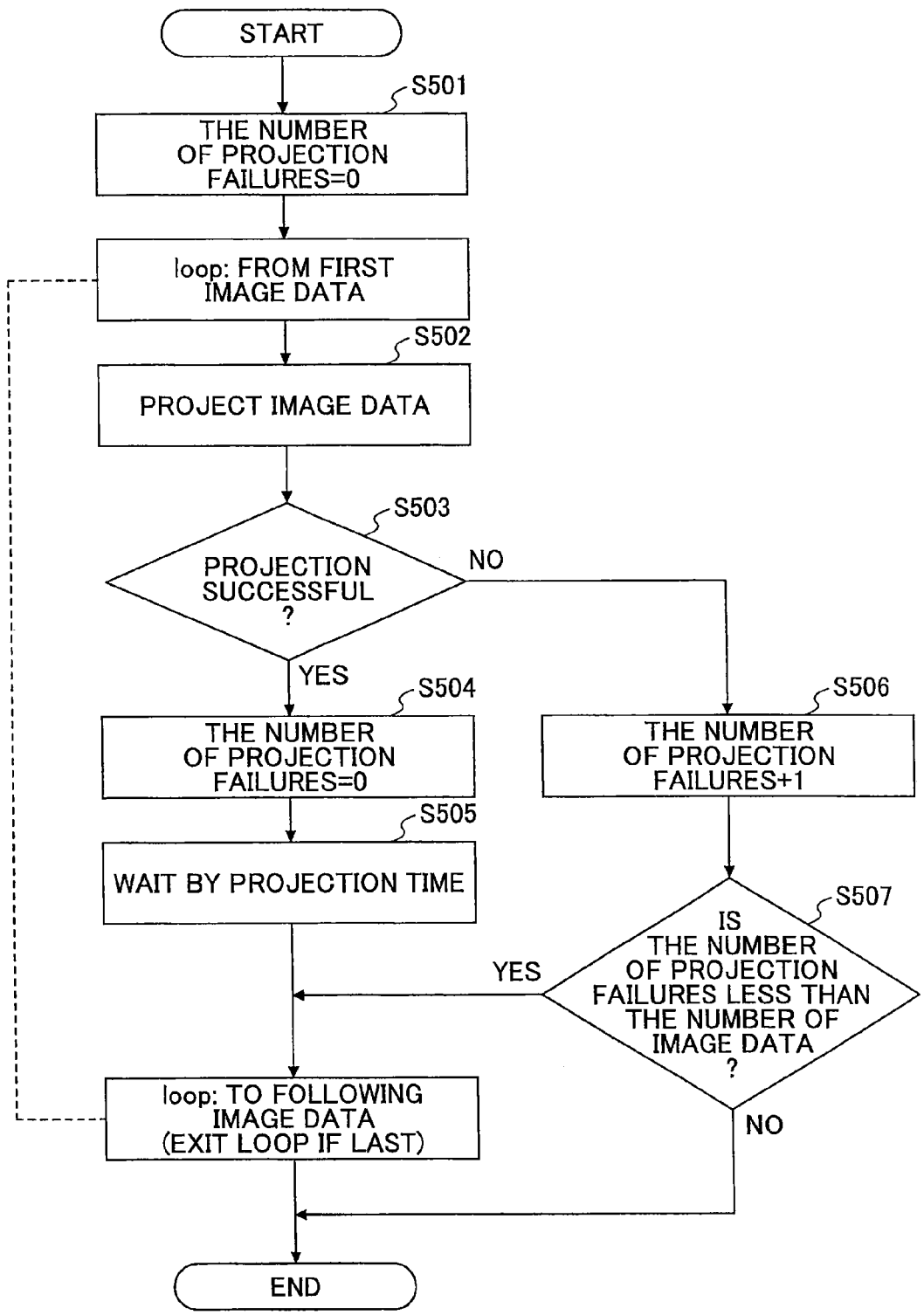
FIG. 16 is an exemplary flowchart of an image projection process in the display apparatus according to the present embodiment.

Next, in the process of step S310 in the above-described projection execution process, a process after accepting, by the display control unit 3070, the request for displaying the reproduction content data 3110 is described. FIG. 16 is an exemplary flowchart of an image projection process in the display apparatus according to the present embodiment.

Below, it is assumed that, as one example, the reproduction content data 3110 are image data.

First, the display control unit 3070 initializes the number of projection failures that is a counter for counting the number of times of failure in projecting the reproduction content data 3110 to 0 (step S501). Next, for the reproduction content data 3110 designated in the execution information 3150, the process of steps S502-S505 is performed.

The display control unit 3070 executes projection of the reproduction content data 3110 in accordance with the value of the Order item designated in the execution information 3150 (step S502) and determines whether the projection has succeeded (step S503). A case in which projection of the reproduction content data 3110 fails includes a case in which the reproduction content data 3110 to be projected is damaged due to some cause, etc., for example. If the projection succeeds, the process proceeds to step S504, while, if the projection fails, the process proceeds to step S506.

If the projection of the reproduction content data 3110 succeeds, the display control unit 3070 zero clears the value of the number of projection failures (step S504), and waits by a projection time (step S505). In other words, in the execution information 3150, for example, the display control unit 3070 waits by the value of the Time item of the reproduction content data 3110 being projected. The display control unit 3070 may perform the process of the above-described steps S502-S505 on the reproduction content data 3110 designated in the execution information 3150 to project the reproduction content data 3110 onto the screen 300-2.

In the process in step S503, if the projection of the reproduction content data 3110 fails, the display control unit 3070 increments by 1 the number of projection failures (step S506). Then, the display control unit 3070 compares the number of projection failures with the number of reproduction content data 3110 designated in the execution information 3150 (step S507). In other words, if the number of projection failures is less than the number of the reproduction content data 3110 (YES in step S507), the reproduction content data 3110 for which the projection failed are skipped and projection of the following reproduction content data 3110 is performed. If the projection of all of the reproduction content data 3110 fails (NO in step S507), the process is finished.

In the above-described image projection process, for all of the reproduction content data 3110, the process of steps S502-S505 may be repeated. In other words, it may be arranged to perform projection of the first reproduction content data 3110 in the projection order designated in the execution information 3150 upon finishing of the projection of the last reproduction content data 3110 in the projection order designated in the execution information 3150.

As described above, the display apparatus 300 may display the reproduction content data 3110 in accordance with the execution information 3150. Here, when the display apparatus 300 is not able to project the reproduction content data 3110, it may skip the projection of the reproduction content data 3110 and display the following reproduction content data 3110.

(Variation)

Next, a variation of the present embodiment is described. FIG. 17 is a diagram illustrating an exemplary system configuration of the display system according to a variation of the present embodiment. A display system 100 according to the present variation includes an information terminal 200, a display apparatus 300, and a content provision server 400.

According to the present variation, the content data are stored in the content provision server 400. Therefore, the value of the Path item of the reproduction control information 3120 and the execution information 3150 takes a storage destination (designated with a URL, etc., for example) of the content provision server 400. Then, when the projection execution request is received, for example, the display apparatus 300 obtains applicable content data designated in the execution information 3150 from the content provision server 400 and causes it to be displayed thereon.

SUMMARY

As described above, a display system according to the present embodiment makes it possible to analyze reproduction control information 3120 in which is designated a display mode of the reproduction content data 3110 which are caused to be displayed on the display apparatus 300 and generate the execution information 3150 from this reproduction control information 3120. Then, the reproduction content data 3110 may be caused to be displayed on the display apparatus 300 in accordance with the execution information 3150 to cause the reproduction content data 3110 to be displayed in a display mode designated by the user.

As described above, the embodiments of the present invention have been described in detail. However, the present invention is not limited to such specific embodiment, so that variations and modifications are possible within the scope of the gist of the present invention that are recited in the claims.

The present application is based on and claims the benefit of priority of Japanese Priority Application No. 2013-210909 filed on Oct. 8, 2013, the entire contents of which is hereby incorporated by reference.

The invention claimed is:

1. A display apparatus which can communicate with an information terminal via a network, comprising:
   a receiver which receives, from the information terminal, content data to be displayed on the display apparatus and reproduction control information related to reproduction of the content data; and
   processing circuitry configured to
      generate execution information from the reproduction control information; and
      cause the content data to be displayed on the display apparatus based on the generated execution information,
      wherein the processing circuitry is further configured to detect an occurrence of a cause to stop a process of file saving during the process of file saving, and when the occurrence is detected, access a memory to determine, based on both a type of the cause to stop the file saving and a timing of cancellation of the process of file saving, a particular operation to finish the process of file saving.

2. The display apparatus as claimed in claim 1, further comprising the memory, which stores the content data and the reproduction control information received by the receiver,
   wherein the processing circuitry generates the execution information from the reproduction control information stored in the memory.

3. The display apparatus as claimed in claim 2, wherein the memory stores the content data and the reproduction control information when a saving request is received from the information terminal.

4. The display apparatus as claimed in claim 2, wherein the memory further stores a default value of an information on the reproduction of the content data, and wherein the processing circuitry generates the execution information in which the default value is set, when a value of said information on the reproduction of the content data included in the reproduction control information is not set.

5. The display apparatus as claimed in claim 1, wherein the processing circuitry is further configured to report an error to the information terminal when an information on the reproduction of the content data included in the reproduction control information satisfies a predetermined condition.

6. The display apparatus as claimed in claim 5, wherein the reproduction control information includes version information of the reproduction control information as the information on the reproduction of the content data, and wherein the processing circuitry reports the error to the information terminal when the version information is different from version information corresponding to the display apparatus.

7. The display apparatus as claimed in claim 5, wherein the reproduction control information includes information on a file extension of the content data as the information on the reproduction of the content data, and wherein the processing circuitry reports the error to the information terminal when the information on the file extension is not in a predetermined format.

8. The display apparatus as claimed in claim 5, wherein the reproduction control information includes information on a time at which the content data are caused to be displayed on the display apparatus as the information on the reproduction of the content data, and wherein the processing circuitry reports the error to the information terminal when the information on the time is not within a predetermined range.

9. The display apparatus as claimed in claim 1, wherein the reproduction control information includes information on an order for a plurality of the content data to be displayed on the display apparatus as the information on the reproduction of the content data, and wherein the processing circuitry causes the plurality of the content data to be displayed in accordance with the information on the order, and the processing circuitry causes the content data designated to be displayed first in the information on the order to be displayed first.

10. The display apparatus as claimed in claim 1, wherein, when there are non-displayable content data in the content data, the processing circuitry causes the content data other than the non-displayable content data to be displayed.

11. The display apparatus of claim 1, wherein the processing circuitry is configured to determine the particular operation to finish the process of file saving based in part on the timing of cancellation of the process of file saving, the timing being a time with respect to an Hypertext Transfer Protocol (HTTP) event.

12. A display system including an information terminal, and a display apparatus which can communicate with the information terminal via a network, wherein the display apparatus includes a receiver which receives, from the information terminal, content data to be displayed on the display apparatus and reproduction control information related to reproduction of the content data; and processing circuitry configured to generate execution information from the reproduction control information; and cause the content data to be displayed on the display apparatus based on the generated execution information, wherein the processing circuitry is further configured to detect an occurrence of a cause to stop a process of file saving during the process of file saving, and when the occurrence is detected, access a memory to determine, based on both a type of the cause to stop the file saving and a timing of cancellation of the process of file saving, a particular operation to finish the process of file saving.

* * * * *